United States Patent
Alexanderson et al.

(10) Patent No.: US 12,262,149 B2
(45) Date of Patent: Mar. 25, 2025

(54) SYSTEMS AND METHODS FOR TRANSMITTING MEDICAL VIDEO DATA IN A BANDWIDTH CONSTRAINED ENVIRONMENT

(71) Applicant: Stryker Corporation, Kalamazoo, MI (US)

(72) Inventors: James Kenneth Alexanderson, Coppell, TX (US); Eric Alexander Hereford, North Richland Hills, TX (US); Sean Victor Hastings, Flower Mound, TX (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/146,997

(22) Filed: Dec. 27, 2022

(65) Prior Publication Data

US 2023/0209018 A1 Jun. 29, 2023

Related U.S. Application Data

(60) Provisional application No. 63/294,360, filed on Dec. 28, 2021.

(51) Int. Cl.
*H04N 7/18* (2006.01)
*H04N 21/2343* (2011.01)

(52) U.S. Cl.
CPC ....... *H04N 7/183* (2013.01); *H04N 21/23439* (2013.01)

(58) Field of Classification Search
CPC .. H04N 7/183; H04N 21/23439; H04N 7/185; H04N 21/234363
USPC ...................................................... 725/149
See application file for complete search history.

(56) References Cited

U.S. PATENT DOCUMENTS

| | | | |
|---|---|---|---|
| 9,936,208 B1 | 4/2018 | Brailovskiy | |
| 10,219,014 B2* | 2/2019 | Van Dusen | H04N 21/440281 |
| 10,523,914 B1* | 12/2019 | Phillips | H04N 21/21805 |
| 2002/0176619 A1* | 11/2002 | Love | G06T 7/00 382/154 |
| 2007/0157260 A1* | 7/2007 | Walker | H04N 21/47214 725/86 |
| 2014/0205024 A1 | 7/2014 | Toba | |
| 2017/0127014 A1 | 5/2017 | Last | |
| 2020/0122645 A1* | 4/2020 | Tsai | H04N 23/70 |
| 2020/0337776 A1 | 10/2020 | Saun | |

(Continued)

OTHER PUBLICATIONS

Extended European Search Report dated Apr. 26, 2023, directed to EP Application No. 22216919.5; 9 pages.

*Primary Examiner* — Adil Ocak
(74) *Attorney, Agent, or Firm* — Morrison & Foerster LLP

(57) ABSTRACT

Provided herein are systems and methods for transmitting medical imaging data across a transmission channel that may be bandwidth constrained. In one or more examples, the system and methods can include transmitting the medical imaging data across a channel using a first specification, and then changing the specification in response to a detected reduction in the available bandwidth of the channel. In one or more examples, the second specification can be based on the type of video data being transmitted. In one or more examples, the medical video data can be apportioned into a region of interest and a region of non-interest, and each region can be transmitted across the channel based on the available bandwidth of the channel.

19 Claims, 10 Drawing Sheets

(56) References Cited

U.S. PATENT DOCUMENTS

2021/0074226 A1\* 3/2021 Ikeyama ............... G09G 3/3426
2021/0313077 A1\* 10/2021 Smurro .................... G06N 3/08

\* cited by examiner

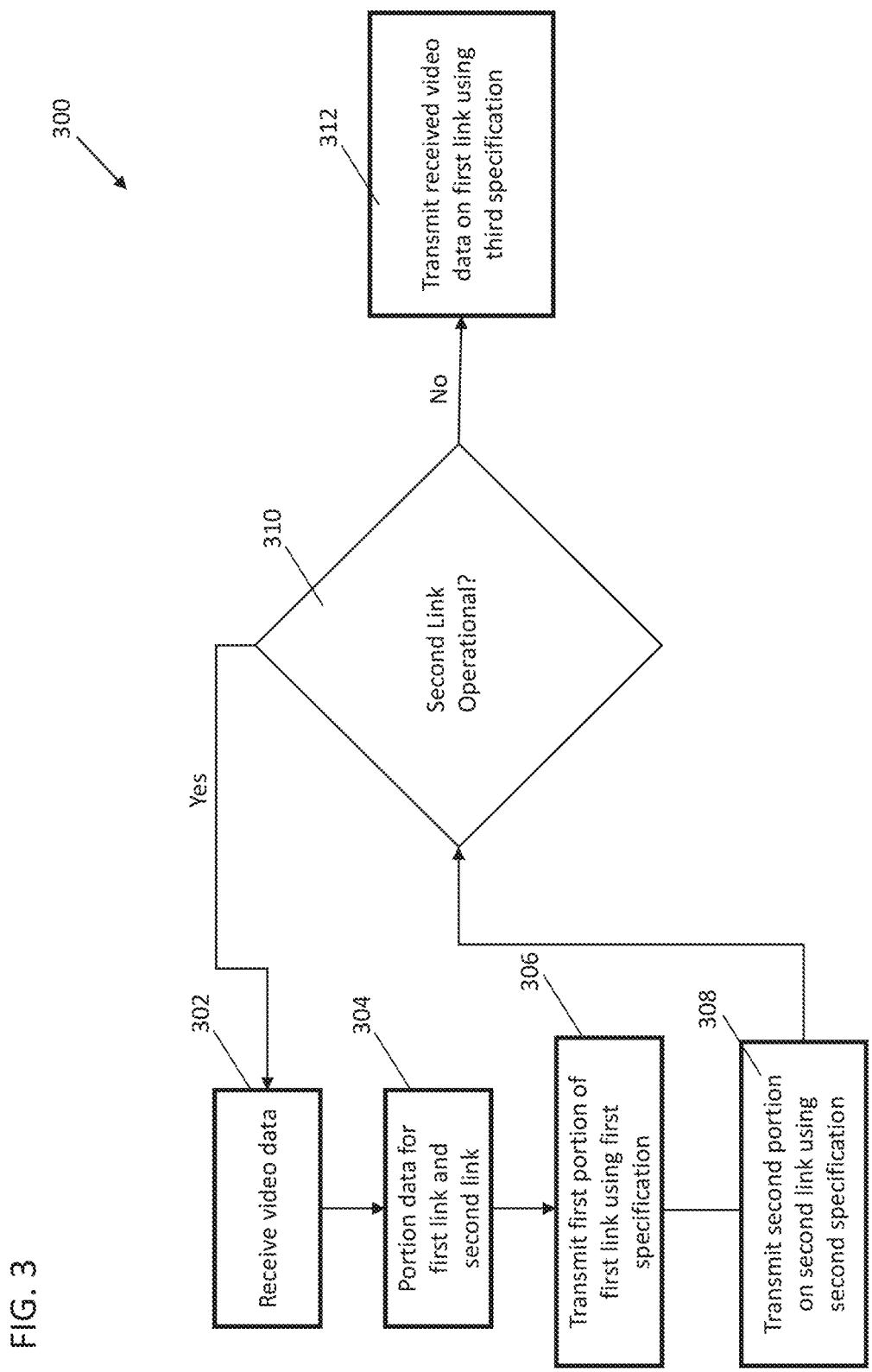

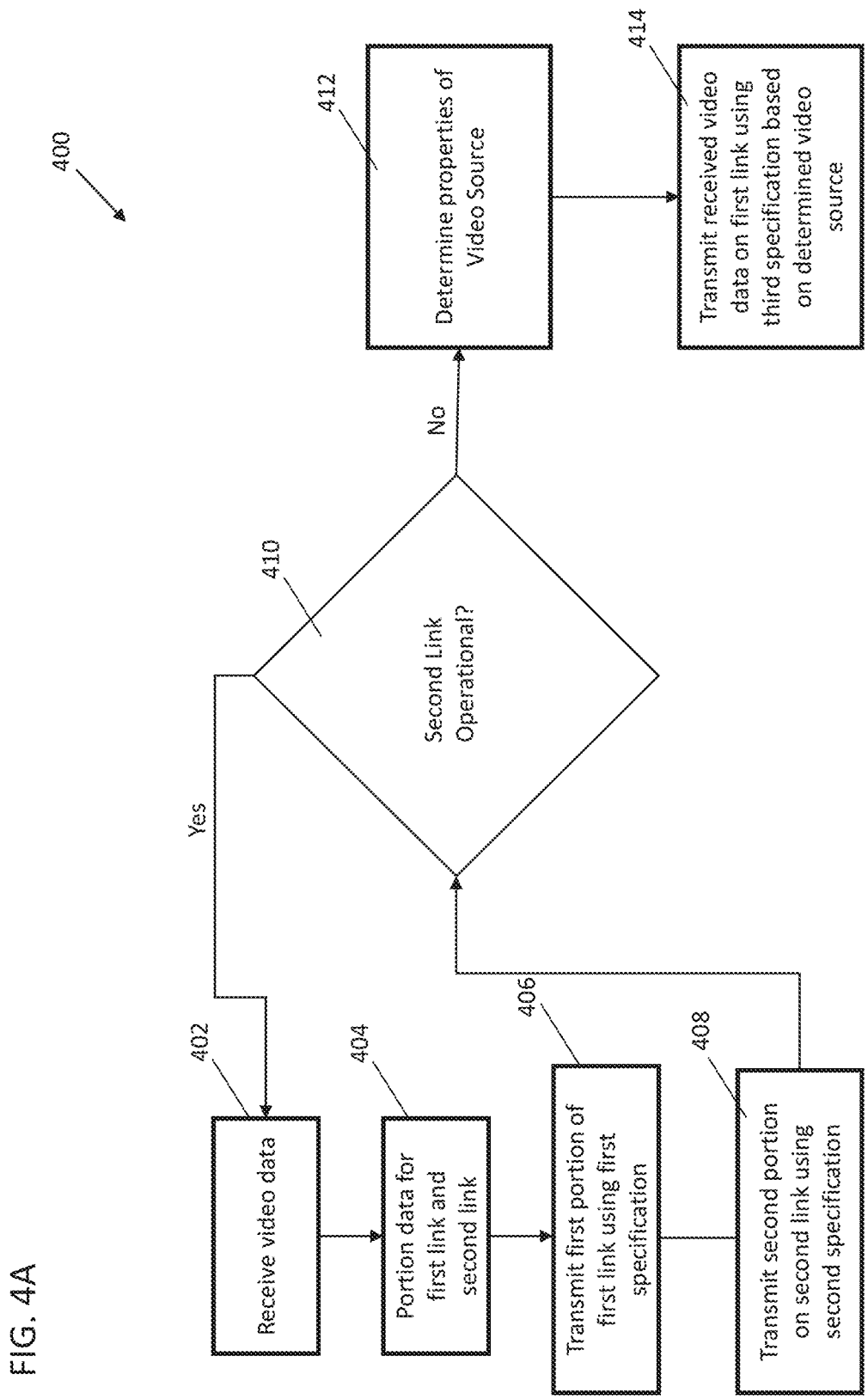

SYSTEMS AND METHODS FOR TRANSMITTING MEDICAL VIDEO DATA IN A BANDWIDTH CONSTRAINED ENVIRONMENT

CROSS-REFERENCE TO RELATED APPLICATIONS

This application claims the benefit of U.S. Provisional Application No. 63/294,360, filed Dec. 28, 2021, the entire contents of which are hereby incorporated by reference herein.

FIELD

This disclosure relates to systems and methods for transmitting medical video data in bandwidth constrained environments while ensuring that the images from the video maintain certain requirements so that they can be safely used during medical procedures performed by a healthcare practitioner.

BACKGROUND

Minimally invasive surgery generally involves the use of a high-definition camera coupled to an endoscope inserted into a patient to provide a surgeon with a clear and precise view within the body. In many instances, the video data collected at the camera will be transmitted to a display device that will render the video data collected onto a display so that the surgeon can visualize the internal area of the body that is being viewed by the camera. The clarity and resolution of the medical video data when it is rendered on a video display can be critical to ensuring that the surgeon can visualize the internal portion of the patient with enough clarity to safely perform a given medical procedure.

Modern surgical cameras are now equipped to capture video at high resolutions and clarity. For instance, 4K video has become an industry standard, and provides the surgeon with video at clarity and resolution that was not possible in the past. The advances in clarity and resolution of medical video data has also meant that more bandwidth is needed to transmit medical video data from one point to another since the number of bits required to render a single pixel (let alone an entire image) has increased. While the camera or other equipment used to the capture the video can provide the surgeon with crystal clear imaging of the internal area of a patient, the full imaging capability of the equipment may not be realized if bandwidth limitations during the transmission of the video data, frustrates the rendering of that video data such that the image cannot be displayed with the same clarity and resolution as it was captured.

Moreover, once a surgery or procedure has begun, the imaging provided by the medical video device must continuously be available throughout the procedure. Any interruption to the video data caused by communication issues (such as a data link failing) can jeopardize the safety of the patient and make completing the procedure a nearly impossible task. Even absent total failure, any degradation to video caused by a sudden drop in bandwidth can create an unsafe situation because the surgeon may be then required to perform the procedure without being able to clearly visualize the internal portion of the patient clearly which can increase the chances that a mistake is made during the medical procedure.

Thus, not only is a medical video system, in which video data is transmitted from a camera or other imaging device to a video display, required to provide clear imaging and resolution of the images in a constrained bandwidth video environment, but furthermore the system should be configured to ensure that any sudden drops in bandwidth do not compromise the safety of the medical procedure, and thus should be configured to have contingencies built into the system to ensure continuous quality video data throughout the procedure.

SUMMARY

According to an aspect, video data taken from an endoscopic or other medical imaging device can be transmitted from the device to a display for rendering the data on a screen. In one or more examples, the data can be transmitted from the device to the display via a router that transmits the data using a dual-link connection, configured to transmit a portion of the video using a first link and a second portion of the video using the second link. Once the data arrives over the two links, the data can be recombined and rendered on a display to provide the surgeon with a clear picture of what the camera is imaging. In one or more examples, the first link can transmit a portion of a data at a first frame rate on a first link, and a second portion of the data at a second frame rate on the second link. In one or more examples, if the first link ceases to operate during transmission of the video, the first and second portions of the video can both be transmitted on the second link according to a third frame rate that is less than the sum of the first frame rate and the second frame rate. Optionally, instead of adjusting the frame rate if a link fails, the systems and methods described above can also adjust other factors that contribute to the overall bandwidth of video data such as color scheme, resolution, etc.

According to an aspect, if the first link fails during transmission, then the systems and methods described herein can select a mitigation procedure that is commensurate with the type of video being transmitted. For instance, in the event that the video is from a radiology device such that there is little to no motion in the video, then the system can place the entirety of the video on the second link at a decreased frame rate, or even lower the color resolution of the image in order to transmit the video at a lower overall bandwidth. In one or more examples, and based on the determined video type, the system can alter the overall bandwidth of the data by down sampling the video data, only transmitting alternate lines of the video feed, etc.

According to an aspect, in a communications transmission link, a first link can be used to transmit a region of interest of the video. In one or more examples, the region of interest can be transmitted in an uncompressed format. A region of disinterest of a video image can be transmitted using compression to lower the overall bandwidth of the signal on the second link. Once the data on both the first link and the second links have been transmitted and received, the data can be overlaid on top of one another for rendering on a display. In one or more examples, the region of interest can be defined by a user of the video equipment. Optionally, the region of interest can be determined using one or more machine learning classifiers that are trained using a supervised training process. In one or more examples, the size of the region of interest can be based on the available bandwidth of the system such that in the event that the bandwidth of the system diminished, the region of interest can be made smaller so as to reduce the overall bandwidth of the video signal.

According to an aspect, a method for transmitting medical video data on a communications channel of a medical data routing system includes: receiving video data from a medical video source; transmitting a first portion of the received data to a display on a first link of the communications channel according to a first pre-defined specification; transmitting a second portion of the received data to the display on a second link of the communications channel according to a second predefined specification; determining if the second link of the communications channel is operating; and if the second link is determined to not be operating: transmitting the received video data on the first link of the communications channel according to a third pre-defined specification, wherein a bandwidth of the third pre-defined specification is less than the combined bandwidth of the first and second pre-defined specification.

Optionally, the received video data is captured at a first frame rate, wherein the first pre-defined specification comprises a second frame rate, wherein the second pre-defined specification comprises a third frame rate, and wherein the second and third frame rates added together equal the first frame rate.

Optionally, the first frame rate is between 30-120 frames per second.

Optionally, the second frame rate is approximately half of the first frame rate, and the third frame rate is approximately half of the first frame rate.

Optionally, the third pre-defined specification comprises a fourth frame rate, and wherein the fourth frame rate is equal to the second frame rate.

Optionally, the video data includes a plurality of lines, wherein the first pre-defined specification comprises transmitting a first portion of the plurality of lines on the first link of the communications channel and the second pre-defined specification comprises transmitting a second portion of the plurality of lines on the second link of the communications channel; and wherein each line of the plurality of lines in the video data is represented either by the first portion of the plurality of lines or the second portion of the plurality of lines.

Optionally, the third pre-defined specification comprises transmitting the first portion of the plurality of lines during a first pre-defined time period on the first link of the communications channel and transmitting the second portion of the plurality of lines during lines during a second pre-defined time period on the first link of the communications channel.

Optionally, the method comprises determining a type of video data received from the medical video source.

Optionally, the third pre-defined specification is based on the determined type of video data received from the medical video source.

Optionally, the type of video data received from the medical video source comprises endoscopic camera video data.

Optionally, if the determined type of video data received from the camera of the medical video peripheral is endoscopic camera video data, then the third pre-defined specification comprises downscaling the received video data from the medical video peripheral device.

Optionally, if the determined type of video data received from the camera of the medical video peripheral is endoscopic camera video data, then the third specification comprises applying alight compression process to the received video data.

Optionally, the determined type of video data received from the medical video source is endoscopic camera video data, then the third specification comprises transmitting a pre-defined region of interest (ROI) of the received video data.

Optionally, the type of video data received from the camera of the medical video peripheral comprises radiology video data.

Optionally, the determined type of video data received from the camera of the medical video peripheral is radiology video data, then the third pre-defined specification comprises transmitting the video data at a frame rate that is lower than the frame rate of the received video data from the medical video peripheral device.

Optionally, if the determined type of video data received from the camera of the medical video peripheral is radiology video data, then the first pre-defined specification comprises transmitting the video data a first frame rate.

Optionally, determining the type of video data received from the camera of the medical video peripheral comprises receiving identification data pertaining to the medical video peripheral configured to identify the type of video data received from the medical video peripheral.

Optionally, determining the type of video data received from the camera of the medical video peripheral comprises determining a quantity of grayscale pixels in the received video data.

Optionally, wherein if the determined quantity of grayscale pixels in the received video data exceeds a pre-defined threshold, then the determined video type is radiology video data.

Optionally, determining the type of video data received from the camera of the medical video peripheral comprises determining an amount of movement in the video data.

Optionally, determining an amount of movement in the video data comprises comparing a first frame of the video data to a second frame of the video data.

Optionally, the first portion of the video data is based on a pre-defined region of interest in the received video data.

Optionally, the first pre-defined specification comprises transmitting the first portion of received of the video data uncompressed.

Optionally, the method comprises determining a bandwidth of the first link of the communications channel, and wherein a size of the pre-defined region of interest is based on the determined bandwidth of the first link of the communications channel.

Optionally, the second portion of the video data is based on pre-defined region of non-interest in the received video data.

Optionally, the second pre-defined specification comprises applying a video compression process to the second portion of the video data.

Optionally, the second portion of the video data comprises all of the video data received from the medical video peripheral device.

Optionally, the second pre-defined specification comprises applying a video compression process to the second portion of the video data.

Optionally, the method comprises overlaying the first portion of the video data over the second portion of the video data at a display configured to display the received video data.

Optionally, the region of interest is defined based on an output of machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

Optionally, the method comprises determining if the first link of the communications channel is operating; and if the first link is determined to not be operating: transmitting the received video data on the second link of the communications channel according to the third pre-defined specification.

Optionally, the received video data is ultra high definition (UHD) video data.

Optionally, the received video data is 8K UHD video data.

According to an aspect, a method for transmitting medical video data on a communications channel includes: receiving video data from a medical video source; transmitting a first portion of the received data on a first link of the communications channel according to a first pre-defined specification, wherein the first portion of the video data is based on a pre-defined region of interest in the received video; transmitting a second portion of the received data on a second link of the communications channel according to a second predefined specification, wherein the second portion of the video data is based on pre-defined region of non-interest in the received video data; and overlaying the first portion of the video data over the second portion of the video data at a display configured to display the received video data.

Optionally, the first pre-defined specification comprises transmitting the first portion of received of the video data uncompressed.

Optionally, the method comprises determining a bandwidth of the first link of the communications channel, and wherein a size of the pre-defined region of interest is based on the determined bandwidth of the first link of the communications channel.

Optionally, the second pre-defined specification comprises applying a video compression process to the second portion of the video data.

Optionally, the second portion of the video data comprises all of the video data received from the medical video peripheral device.

Optionally, the second pre-defined specification comprises applying a video compression process to the second portion of the video data.

Optionally, the region of interest is defined based on an output of machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

According to an aspect, a system for transmitting medical video data on a communications channel includes: a memory; one or more processors; wherein the memory stores one or more programs that when executed by the one or more processors, cause the one or more processors to: receive video data from a medical video source; transmit a first portion of the received data to a display on a first link of the communications channel according to a first pre-defined specification; transmit a second portion of the received data to the display on a second link of the communications channel according to a second predefined specification; determine if the second link of the communications channel is operating; and if the second link is determined to not be operating: transmit the received video data on the first link of the communications channel according to a third pre-defined specification, wherein a bandwidth of the third pre-defined specification is less than the combined bandwidth of the first and second pre-defined specification.

Optionally, the received video data is captured at a first frame rate, wherein the first pre-defined specification comprises a second frame rate, wherein the second pre-defined specification comprises a third frame rate, and wherein the second and third frame rates added together equal the first frame rate.

Optionally, the first frame rate is between 30-120 frames per second.

Optionally, the second frame rate is approximately half of the first frame rate, and the third frame rate is approximately half of the first frame rate.

Optionally, the third pre-defined specification comprises a fourth frame rate, and wherein the fourth frame rate is equal to the second frame rate.

Optionally, the video data includes a plurality of lines, wherein the first pre-defined specification comprises transmitting a first portion of the plurality of lines on the first link of the communications channel and the second pre-defined specification comprises transmitting a second portion of the plurality of lines on the second link of the communications channel; and wherein each line of the plurality of lines in the video data is represented either by the first portion of the plurality of lines or the second portion of the plurality of lines.

Optionally, the third pre-defined specification comprises transmitting the first portion of the plurality of lines during a first pre-defined time period on the first link of the communications channel and transmitting the second portion of the plurality of lines during lines during a second pre-defined time period on the first link of the communications channel.

Optionally, the one or more processors are caused to determine a type of video data received from the medical video source.

Optionally, the third pre-defined specification is based on the determined type of video data received from the medical video source.

Optionally, the type of video data received from the medical video source comprises endoscopic camera video data.

Optionally, if the determined type of video data received from the camera of the medical video peripheral is endoscopic camera video data, then the third pre-defined specification comprises downscaling the received video data from the medical video peripheral device.

Optionally, if the determined type of video data received from the camera of the medical video peripheral is endoscopic camera video data, then the third specification comprises applying a light compression process to the received video data.

Optionally, the determined type of video data received from the medical video source is endoscopic camera video data, then the third specification comprises transmitting a pre-defined region of interest (ROI) of the received video data.

Optionally, the type of video data received from the camera of the medical video peripheral comprises radiology video data.

Optionally, the determined type of video data received from the camera of the medical video peripheral is radiology video data, then the third pre-defined specification comprises transmitting the video data at a frame rate that is lower than the frame rate of the received video data from the medical video peripheral device.

Optionally, if the determined type of video data received from the camera of the medical video peripheral is radiology video data, then the first pre-defined specification comprises transmitting the video data a first frame rate.

Optionally, determining the type of video data received from the camera of the medical video peripheral comprises receiving identification data pertaining to the medical video peripheral configured to identify the type of video data received from the medical video peripheral.

Optionally, determining the type of video data received from the camera of the medical video peripheral comprises determining a quantity of grayscale pixels in the received video data.

Optionally, wherein if the determined quantity of grayscale pixels in the received video data exceeds a pre-defined threshold, then the determined video type is radiology video data.

Optionally, determining the type of video data received from the camera of the medical video peripheral comprises determining an amount of movement in the video data.

Optionally, determining an amount of movement in the video data comprises comparing a first frame of the video data to a second frame of the video data.

Optionally, the first portion of the video data is based on a pre-defined region of interest in the received video data.

Optionally, the first pre-defined specification comprises transmitting the first portion of received of the video data uncompressed.

Optionally, the one or more processors are caused to determine a bandwidth of the first link of the communications channel, and wherein a size of the pre-defined region of interest is based on the determined bandwidth of the first link of the communications channel.

Optionally, the second portion of the video data is based on pre-defined region of non-interest in the received video data.

Optionally, the second pre-defined specification comprises applying a video compression process to the second portion of the video data.

Optionally, the second portion of the video data comprises all of the video data received from the medical video peripheral device.

Optionally, the second pre-defined specification comprises applying a video compression process to the second portion of the video data.

Optionally, the one or more processors are caused to overlaying the first portion of the video data over the second portion of the video data at a display configured to display the received video data.

Optionally, the region of interest is defined based on an output of machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

Optionally, the one or more processors are caused to determine if the first link of the communications channel is operating; and if the first link is determined to not be operating: transmitting the received video data on the second link of the communications channel according to the third pre-defined specification.

Optionally, the received video data is ultra high definition (UHD) video data.

Optionally, the received video data is 8K UHD video data.

According to an aspect, a method for transmitting medical video data on a communications channel includes: receiving video data from a medical video source; transmitting a first portion of the received data on a first link of the communications channel according to a first pre-defined specification, wherein the first portion of the video data is based on a pre-defined region of interest in the received video; transmitting a second portion of the received data on a second link of the communications channel according to a second predefined specification, wherein the second portion of the video data is based on pre-defined region of non-interest in the received video data; and overlaying the first portion of the video data over the second portion of the video data at a display configured to display the received video data.

Optionally, the first pre-defined specification comprises transmitting the first portion of received of the video data uncompressed.

Optionally, the one or more processors are caused to determine a bandwidth of the first link of the communications channel, and wherein a size of the pre-defined region of interest is based on the determined bandwidth of the first link of the communications channel.

Optionally, the second pre-defined specification comprises applying a video compression process to the second portion of the video data.

Optionally, the second portion of the video data comprises all of the video data received from the medical video peripheral device.

Optionally, the second pre-defined specification comprises applying a video compression process to the second portion of the video data.

Optionally, the region of interest is defined based on an output of machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

According to an aspect, provided herein is a non-transitory computer readable storage medium storing one or more programs for transmitting medical video data on a communications channel of a medical data routing system, for execution by one or more processors of an electronic device that when executed by the device, cause the device to: receive video data from a medical video source; transmit a first portion of the received data to a display on a first link of the communications channel according to a first pre-defined specification; transmit a second portion of the received data to the display on a second link of the communications channel according to a second predefined specification; determine if the second link of the communications channel is operating; and if the second link is determined to not be operating: transmit the received video data on the first link of the communications channel according to a third pre-defined specification, wherein a bandwidth of the third pre-defined specification is less than the combined bandwidth of the first and second pre-defined specification.

Optionally, the received video data is captured at a first frame rate, wherein the first pre-defined specification comprises a second frame rate, wherein the second pre-defined specification comprises a third frame rate, and wherein the second and third frame rates added together equal the first frame rate.

Optionally, the first frame rate is between 30-120 frames per second.

Optionally, the second frame rate is approximately half of the first frame rate, and the third frame rate is approximately half of the first frame rate.

Optionally, the third pre-defined specification comprises a fourth frame rate, and wherein the fourth frame rate is equal to the second frame rate.

Optionally, the video data includes a plurality of lines, wherein the first pre-defined specification comprises transmitting a first portion of the plurality of lines on the first link of the communications channel and the second pre-defined specification comprises transmitting a second portion of the plurality of lines on the second link of the communications channel; and wherein each line of the plurality of lines in the video data is represented either by the first portion of the plurality of lines or the second portion of the plurality of lines.

Optionally, the third pre-defined specification comprises transmitting the first portion of the plurality of lines during a first pre-defined time period on the first link of the communications channel and transmitting the second portion of the plurality of lines during lines during a second pre-defined time period on the first link of the communications channel.

Optionally, the device is caused to determine a type of video data received from the medical video source.

Optionally, the third pre-defined specification is based on the determined type of video data received from the medical video source.

Optionally, the type of video data received from the medical video source comprises endoscopic camera video data.

Optionally, if the determined type of video data received from the camera of the medical video peripheral is endoscopic camera video data, then the third pre-defined specification comprises downscaling the received video data from the medical video peripheral device.

Optionally, if the determined type of video data received from the camera of the medical video peripheral is endoscopic camera video data, then the third specification comprises applying alight compression process to the received video data.

Optionally, the determined type of video data received from the medical video source is endoscopic camera video data, then the third specification comprises transmitting a pre-defined region of interest (ROI) of the received video data.

Optionally, the type of video data received from the camera of the medical video peripheral comprises radiology video data.

Optionally, the determined type of video data received from the camera of the medical video peripheral is radiology video data, then the third pre-defined specification comprises transmitting the video data at a frame rate that is lower than the frame rate of the received video data from the medical video peripheral device.

Optionally, if the determined type of video data received from the camera of the medical video peripheral is radiology video data, then the first pre-defined specification comprises transmitting the video data a first frame rate.

Optionally, determining the type of video data received from the camera of the medical video peripheral comprises receiving identification data pertaining to the medical video peripheral configured to identify the type of video data received from the medical video peripheral.

Optionally, determining the type of video data received from the camera of the medical video peripheral comprises determining a quantity of grayscale pixels in the received video data.

Optionally, wherein if the determined quantity of grayscale pixels in the received video data exceeds a pre-defined threshold, then the determined video type is radiology video data.

Optionally, determining the type of video data received from the camera of the medical video peripheral comprises determining an amount of movement in the video data.

Optionally, determining an amount of movement in the video data comprises comparing a first frame of the video data to a second frame of the video data.

Optionally, the first portion of the video data is based on a pre-defined region of interest in the received video data.

Optionally, the first pre-defined specification comprises transmitting the first portion of received of the video data uncompressed.

Optionally, the device is caused to determine a bandwidth of the first link of the communications channel, and wherein a size of the pre-defined region of interest is based on the determined bandwidth of the first link of the communications channel.

Optionally, the second portion of the video data is based on pre-defined region of non-interest in the received video data.

Optionally, the second pre-defined specification comprises applying a video compression process to the second portion of the video data.

Optionally, the second portion of the video data comprises all of the video data received from the medical video peripheral device.

Optionally, the second pre-defined specification comprises applying a video compression process to the second portion of the video data.

Optionally, the device is caused to overlaying the first portion of the video data over the second portion of the video data at a display configured to display the received video data.

Optionally, the region of interest is defined based on an output of machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

Optionally, the device is caused to determine if the first link of the communications channel is operating; and if the first link is determined to not be operating: transmitting the received video data on the second link of the communications channel according to the third pre-defined specification.

Optionally, the received video data is ultra high definition (UHD) video data.

Optionally, the received video data is 8K UHD video data.

According to an aspect, a method for transmitting medical video data on a communications channel includes: receiving video data from a medical video source; transmitting a first portion of the received data on a first link of the communications channel according to a first pre-defined specification, wherein the first portion of the video data is based on a pre-defined region of interest in the received video; transmitting a second portion of the received data on a second link of the communications channel according to a second predefined specification, wherein the second portion of the video data is based on pre-defined region of non-interest in the received video data; and overlaying the first portion of the video data over the second portion of the video data at a display configured to display the received video data.

Optionally, the first pre-defined specification comprises transmitting the first portion of received of the video data uncompressed.

Optionally, the device is caused to determine a bandwidth of the first link of the communications channel, and wherein a size of the pre-defined region of interest is based on the determined bandwidth of the first link of the communications channel.

Optionally, the second pre-defined specification comprises applying a video compression process to the second portion of the video data.

Optionally, the second portion of the video data comprises all of the video data received from the medical video peripheral device.

Optionally, the second pre-defined specification comprises applying a video compression process to the second portion of the video data.

Optionally, the region of interest is defined based on an output of machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

According to an aspect, a method for transmitting medical video data on a communications channel of a medical data routing system comprises: receiving video data from a medical video source, determining if a bandwidth of the communications channel is sufficient to transmit the received video data, if it is determined that the bandwidth of the communications is not sufficient to transmit the received video data, determining a type of video data received from the medical video source, selecting a pre-defined specification based on the determined type of video data received from the medical video source, and transmitting the received video data using the second pre-defined specification.

Optionally, the type of video data received from the medical video source comprises endoscopic camera video data.

Optionally, the determined type of video data received from the camera of the medical video peripheral is endoscopic camera video data, then the pre-defined specification comprises downscaling the received video data from the medical video peripheral device.

Optionally, the determined type of video data received from the camera of the medical video peripheral is endoscopic camera video data, then the pre-determined specification comprises applying a light compression process to the received video data.

Optionally, the type of video data received from the camera of the medical video peripheral comprises radiology video data.

Optionally, the determined type of video data received from the camera of the medical video peripheral is radiology video data, then the pre-defined specification comprises transmitting the video data at a frame rate that is lower than the frame rate of the received video data from the medical video peripheral device.

Optionally, determining the type of video data received from the camera of the medical video source comprises receiving identification data pertaining to the medical video source configured to identify the type of video data received from the medical video source.

Optionally, determining the type of video data received from the medical video source comprises determining a quantity of grayscale pixels in the received video data.

Optionally, determining the type of video data received from the medical video source comprises determining an amount of movement in the video data.

Optionally, determining an amount of movement in the video data comprises comparing a first frame of the video data to a second frame of the video data.

According to an aspect, a method for transmitting medical video data on a communications channel of a medical data routing system comprises: receiving video data from a medical video source, determining if a bandwidth of the communications channel is sufficient to transmit the received video data, and if it is determined that the bandwidth of the communications is not sufficient to transmit the received video data: identifying a region of interest in the received video, identifying a region of non-interest in the received video, transmitting the identified region of interest and the identified region of non-interest according to a pre-defined specification.

Optionally, the pre-defined specification comprises transmitting the identified region of interest uncompressed.

Optionally, the pre-defined specification comprises a size of the region of interest.

Optionally, the pre-defined specification comprises applying a video compression process to the identified region of non-interest of the video data.

Optionally, the identified region of non-interest the video data comprises all of the video data received from the medical video source.

Optionally, the method comprises overlaying the identified region of interest over the identified region of non-interest of the video data at a display configured to display the received video data.

Optionally, the identified region of interest is defined based on an output of a machine learning model configured to identify the region of interest in video data.

Optionally, the machine learning model is trained using a supervised training process.

Optionally, the supervised training process comprises inputting one or more annotated training images to the classifier, wherein the one or more annotated training images identifies a location of a region of interest in the image.

BRIEF DESCRIPTION OF THE FIGURES

The invention will now be described, by way of example only, with reference to the accompanying drawings, in which:

FIG. 3 illustrates an exemplary process for transmitting medical video data in a bandwidth constrained environment according to examples of the disclosure.

FIG. 4A illustrates another exemplary process for transmitting medical video data in a bandwidth constrained environment according to examples of the disclosure.

DETAILED DESCRIPTION

Figure 1:
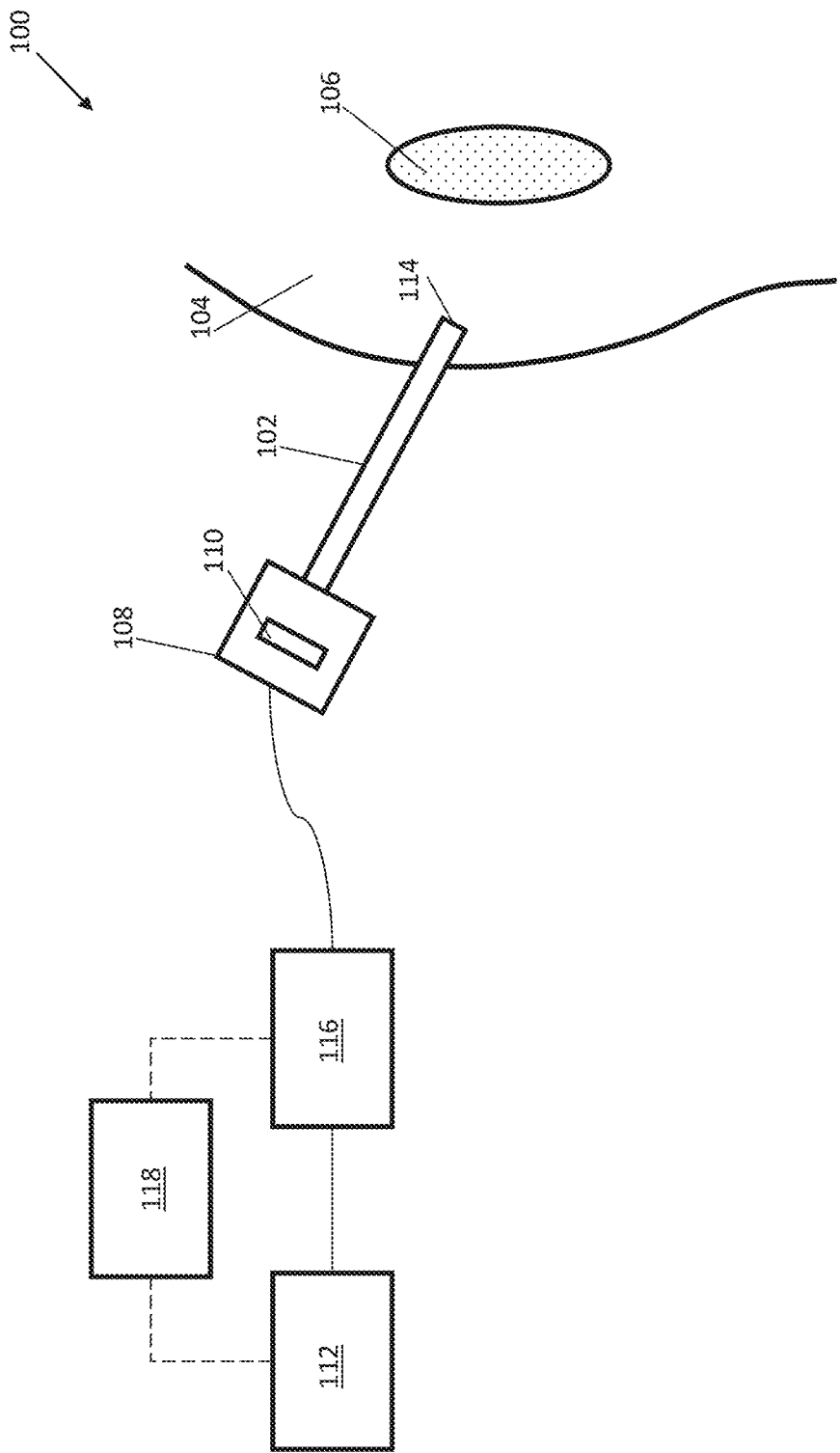
FIG. 1 illustrates an exemplary endoscopy system according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for transmitting medical video data in a bandwidth constrained environment. According to various aspects, medical video data is collected by a medical imaging device such as an endoscope during a surgical procedure. The data collected by the medical imaging device is then transmitted via router to display device, in which the video data is rendered on to a display to be viewed by a medical practitioner during a surgical procedure. In one or more examples, the term "router" can refer to a device or software that is configured to package the medical video data for transmission across a network to the display device. In one or more examples, the router can transmit the medical video data using a dual-link connection in which a portion of the data is transmitted over a first link, and the remaining portion of the medical video data is transmitted over a second link. The first link and second link can be connected to a receiver that is configured to combine the data from the first link and the second link and then render the combined data on a display for viewing by a surgeon or other medical professional during a surgical procedure.

In one or more examples, the portion of the data transmitted over the first link can be transmitted using a first specification, while the portion of the data transmitted over the second link can be transmitted using a second specification. In one or more examples, the first specification can include a pre-determined frame rate, wherein the pre-determined frame rate is within the bandwidth of the first link channel. In one or more examples, the second specification can include a pre-determined frame rate that is the same as the first specification's and is also configured to be within the bandwidth of the second link channel. In one or more examples, if the first link is found to have failed (i.e, transmission over the link is no longer possible) then the entirety of the video data can be transmitted over the second link using a third specification that is within the bandwidth of the second link. In one or more examples, the third specification can include a frame rate that is lower than the combined frame rate of the first and second specification, but still within the bandwidth of the second link.

In one or more examples, alternatively or in addition to frame rate, the first and second specification can also include transmitting the data at a pre-determined resolution so that the transmissions of the data over the first and second links are within the bandwidth of the first and second links. In one or more examples, if a link should fail, then the entirety of the video data can be transmitted over the remaining link using a specification that is within the bandwidth of the remaining link. In one or more examples, the third specification (i.e, the specification used when one of the links fail) can be dependent on the type of medical video data being transmitted. For instance, if the medical video data is found to contain a significant amount of motion, rather than reducing the frame rate of the overall transmission, the third specification can be configured to lower the overall resolution of the medical data (i.e., through compression) such that the overall bandwidth of the data being transmitted on the remaining link is within the bandwidth of the channel created by the link.

In one or more examples, the first link can be used to transmit a "region of interest" in the medical video data uncompressed, while the second link can be used to transmit a "region of disinterest" or the entirety of the data using compression to lower the overall bandwidth of the signal. In one or more examples, the region of interest can expand or decrease based on the available bandwidth of the dual-link channel. In one or more examples, the region of interest can be pre-selected by a user of the system, or alternatively can be determined using one or more machine learning classifiers.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary endoscopy system according to examples of the disclosure. System 100 includes an endoscope 102 for insertion into a surgical cavity 104 for imaging tissue 106 within the surgical cavity 104 during a medical procedure. The endoscope 102 may extend from an endoscopic camera head 108 that includes one or more imaging sensors 110. Light reflected and/or emitted (such as fluorescence light emitted by fluorescing targets that are excited by fluorescence excitation illumination light) from the tissue 106 is received by the distal end 114 of the endoscope 102. The light is propagated by the endoscope 102, such as via one or more optical components (for example, one or more lenses, prisms, light pipes, or other optical components), to the camera head 108, where it is directed onto the one or more imaging sensors 110. In one or more examples, one or more filters (not shown) may be included in the endoscope 102 and/or camera head 108 for filtering a portion of the light received from the tissue 106 (such as fluorescence excitation light).

The one or more imaging sensors 110 generate pixel data that can be transmitted to a camera control unit 112 that is communicatively connected to the camera head 108. The camera control unit 112 generates a video feed from the pixel data that shows the tissue being viewed by the camera at any given moment in time. In one or more examples, the video feed can be transmitted to an image processing unit 116 for further image processing, storage, display, and/or routing to an external device (not shown). The images can be transmitted to one or more displays 118, from the camera control unit 112 and/or the image processing unit 116, for visualization by medical personnel, such as by a surgeon for visualizing the surgical field 104 during a surgical procedure on a patient.

Modern medical imaging equipment such as that described above with respect to FIG. 1 have improved in their ability to transmit high resolution data. For instance, medical imaging equipment today can collect video data at 4K resolution using ultra-high definition (UHD) leading to a higher aspect ratio of the video produced by the imaging equipment and using higher pixel densities to represent video taken by the equipment. These advances means that today video data taken by a imaging device requires more data (i.e., bits) to represent an image. This increase in the number of bits to represent an image has led to the need to increase the bandwidth of channels use to transmit the data to other devices. Since an image now requires more bits to be transmitted, the amount of bandwidth (i.e., the maximum rate of data transfer access across a given path) also needs to be increased, in order to transmit the data to another device with minimal latency. If the bandwidth of a channel is not sufficient to handle the increase in data volume, then it can take an increased amount of time to transmit a single frame of the video data to another device, leading to latency in the video (i.e., the time to display the video may significantly lag the collection of the video data). In order to account for this increased data volume, modern routing architectures (i.e., systems to transmit data from one device to another) have been developed to provide the necessary bandwidth to get the data across a channel.

Figure 2:
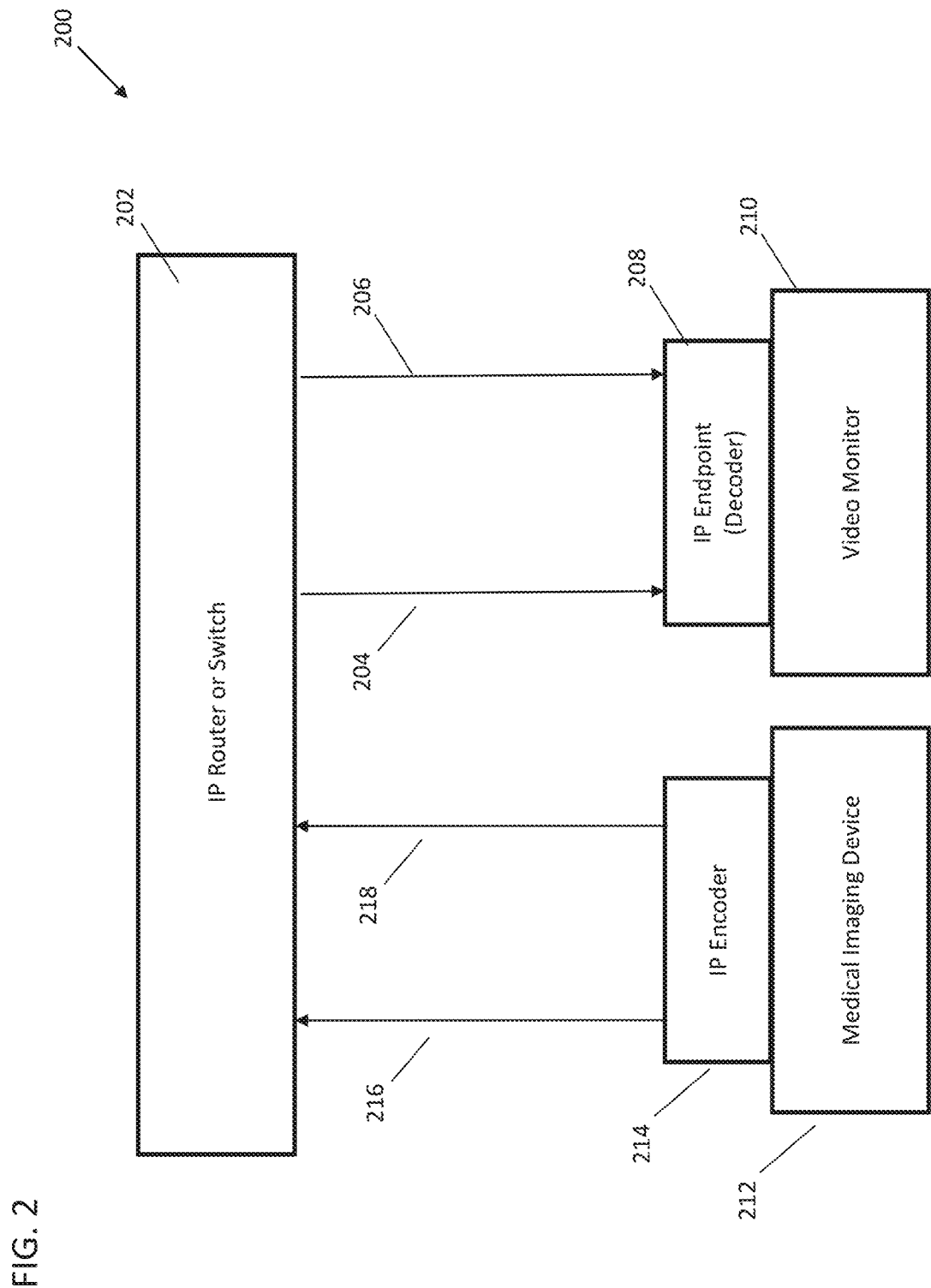
FIG. 2 illustrates an exemplary medical video data routing architecture according to examples of the disclosure.

FIG. 2 illustrates an exemplary medical video data routing architecture according to examples of the disclosure. In one or more examples, the medical data routing system 200 illustrated in FIG. 2 can be configured to route medical video data from a device that is capturing the data, to a display device that is configured to render the medical video data onto a display for viewing during a medical procedure. In one or more examples, the system 200 can be configured to display the data so as to minimize the latency between the collection of the data and the rendering of the data on the display. In one or more examples, the latency can be minimized by providing a system architecture that is configured to meet the bandwidth requirements associated with the medical data. In other words, the system 200 can be configured to provide sufficient throughput, such that the data associated with a frame of video data can be transmitted to the display in near real-time so that the surgeon can view the frame at nearly the same moment as when the video data associated with the frame was captured.

In one or more examples, a medical imaging device 212 (such as an endoscopic camera, x-ray imaging device, etc) can collect imaging data from a patient, and transmit the data to an Internet Protocol (IP) encoder 214. In one or more examples, the IP encoder 214 can collect the data from the medical imaging device 212 and package the data into a plurality of IP packets for transmission from the encoder to a consuming device. In one or more examples, the IP encoder 214 can be located within the medical imaging device or alternatively can be located external to the medical imaging device 212. In one or more examples, the IP encoder 214 can be configured to provide a plurality of 10 gigabit (10G) channels, with each channel having a bandwidth of approximately 10G. The plurality of channels can be provided such that the video data received by the encoder can be portioned between the channels and transmitted simultaneously to the consuming device thereby increasing the total bandwidth of the transmission. In one or more examples, the video data can be uncompressed 4K video taken at 60 frames per second (fps). At such a resolution, the bandwidth of a single 10G channel may not be sufficient to transmit to supply the 4K video to the display. Thus, in one or more examples, the IP encoder 214 can provide two 10G channels (216 and 218) that can split the data into two separate portions and transfer each portion in concurrently, thereby ensuring that the transmission is carried out at a sufficient bandwidth to effectively transmit the uncompressed 4K video. In one or more examples, the channels/ links 216 and 218 can represent two separate physical links. Additionally or alternatively, the links 216 and 218 can represent two separate streams of data sent over the same physical and/or logical link between the encoder 214 and the IP router/switch 202 (described in further detail below). Additionally or alternatively, links 216 and 218 can represent two streams of data sent by the encoder 214 over one or more physical links using an aggregation protocol such as the IEEE 802.3a or 802.1AX link aggregation protocols. The description of the examples below will refer to "links," however, this term should not be construed as referring to physical links, and instead can also include "streams" of data sent over any number of physically separate links.

In one or more examples, the IP encoder 214 can be configured to provide a plurality of 10 gigabit (10G) channels, with each channel having a bandwidth of approximately 10G. The plurality of channels can be provided such that the video data received by the encoder can be portioned between the channels and transmitted simultaneously to the external device thereby increasing the total bandwidth of the transmission. In one or more examples, the video data can be uncompressed 4K video taken at 60 frames per second (fps). At such a resolution, the bandwidth of a single 10G channel may not be sufficient to transmit to supply the 4K video to the display. Thus, in one or more examples, the encoder 214 can provide two 10G channels (204 and 206) that can split the data into two separate portions and transfer each portion in parallel, thereby ensuring that the transmission is carried out at a sufficient bandwidth to effectively transmit the uncompressed 4K video. In one or more examples, the channels/links 204 and 206 can represent two separate physical links. Additionally or alternatively, the links 204 and 206 can represent two separate streams of data sent over the same physical and/or logical link between the router 202 and the IP endpoints 208 (described in further detail below). Additionally or alternatively, links 204 and 206 can represent two streams of data sent by the router 202 over one or more physical links using an aggregation protocol such as the IEEE 802.3a or 802.1AX link aggregation protocols. The description of the examples below will refer to "links," however, this term should not be construed as referring to physical links, and instead can also include "streams" of data sent over any number of physically separate links.

In one or more examples the IP encoder 214 can organize the video data into IP packets, and then transmit a first portion of the packets using the first link 216, and the remaining packets can be transmitted using the second link 218. The first link 216 and the second link 218 can transmit the packets in parallel so as to increase the overall bandwidth (i.e., throughput) of the system 200. In one or more examples, the portioning of the data between the first link and the second link can be based on the region of a video frame the data originates from, or in one or more examples, the apportionment can be based on other factors not related to the location in the frame of the data. In one or more examples, the data transmitted on the first link and the second link does not need to be mutually exclusive, and in one or more examples, there can be overlap between the data transmitted on the first link and the second link.

In one or more examples, the data transmitted over links 216 and 218 can be received by IP endpoint 208 which can be configured to receive data from the links 216 and 218. In one or more examples, the links 216 and 218 can be received by an IP router/switch 202, which can then transmit the received data over links 204 and 206 to IP endpoint (i.e., decoder) 208, which can recombine them to form a single frame of video for rendering on a display/monitor 210. In one or more examples, the endpoint 208 can be configured to undo the apportionment done by encoder 214 such that the data is recombined to form a plurality of frames representing the video data. Thus, in one or more examples, the endpoint 208 can be configured with the apportionment scheme of encoder 214 so as to recombine the data in a manner that can allow for the data to be displayed on a display device. Once the data is received and recombined by IP endpoint 208, the data can be transmitted to a video monitor 210 which can render the data for display which can be viewed by a surgeon during a medical procedure.

The system described above with respect to FIG. 2 can ensure that the video collected by the medical imaging equipment is not bandwidth constrained such that the display of the video suffers from unacceptable latency or other issues associated with operating in a constrained bandwidth environment. However, such a system is not without risk. In one or more examples, one of the links 204, 206, 216, or 218 may fail during operation. For instance, during a medical procedure, link 204 fail making link 206 the only operational link. The impacts of such a failure can be significant. Since the video data had been portioned between the links 204 and 206, a failure of link 204 can mean that only a portion of the data is being transmitted to the video monitor 210, which can lead to a portion of the video not being displayed on the screen. This scenario can jeopardize the safety of the medical procedure since it would effectively mean that the surgeon is only receiving some of the video data and can't see the entire visualized internal portion of the patient. Furthermore, a failure of a link can lower the overall available bandwidth of the system thus reducing the amount of data that can be sent over a logical link or channel (i.e., reducing the overall available bandwidth of the system to transmit data). Thus, even though a link might fail during operation, the system 200 must still maintain a system that can allow the surgeon to visualize the entirety of the video, even if the video data may need to be degraded in order to account for the loss of bandwidth. In one or more examples, the system 200 can be configured to adjust the way in which the video data is transmitted from the encoder 214 to the video monitor 210 such that the entire video can be displayed even if a link (i.e., stream) of the channel has failed or if the available bandwidth of the channel (i.e., logical link) decreases.

In one or more examples, in the event of a link failure, the remaining link can be used to transmit the entirety of the data generated by a medical imaging device, although in some degraded or compressed form so as to account for the lower bandwidth associated with only having a single link/stream available for transmission. For instance, in one or more examples, the system described with respect to FIG. 2 can be used to transfer uncompressed 4K video at 60 fps. However, in the event that one of the links fails, the remaining link may not have sufficient bandwidth to continue transferring 4K video at the 60 fps rate. However, despite the link failure, the surgeon may still need the video to visualize the internal portion of the patient. Thus, as described in detail below, the remaining link can be used to transfer the video albeit in a degraded form, so as to maintain continuity of video for the medical procedure, while taking care not to degrade the video in a manner that may be detrimental to the medical procedure that is being performed.

FIG. 3 illustrates an exemplary method for transmitting medical video data in a bandwidth constrained environment according to examples of the disclosure. The process 300 illustrated in FIG. 3 provides a method for transmitting medical video data over a dual link (described above with respect to FIG. 2) in the event that one of the links fails, thus requiring the entirety of the video data to be sent over single link. In one or more examples, the process 300 of FIG. 3 can be utilized for a system that uses a plurality of links to transmit data, and could include more than two links. In one or more examples, the process 300 can begin at step 302 wherein the video data is received at an IP router from a medical imaging device such as a camera attached to an endoscope. In one or more examples, the received data can be 4K video data at 60 fps per second, but the can include video data at any resolution and frame rate. In one or more examples, once the data is received at step 302, the process 300 can move to step 304 wherein the received data is portioned into a first portion to be sent over a first link of the dual-link channel, and a second portion to be sent over the second link of the dual link channel. In one or more examples, the apportionment can be based on frames such that a first frame is sent over the first link, the next frame is sent over the second link, the next frame is sent over the first link, and so on so forth in an alternating manner. In this way, while the total video frame rate is for example 60 fps (i.e., the rate produced by the medical imaging device) the frame rate over each link of the dual link channel will be half of that or in the example of 60 fps, each link can transmit 30 fps. Thus, each individual link can transmit data within its available bandwidth, but the overall bandwidth of the data can be more than what is available at a single link. In one or more examples, the apportionment of data at step 304 may not be symmetrical. For instance, instead of the first link transmitting at 30 fps and the second link transmitting at 30 fps, the first link could transmit at 45 fps while the second link at 15 fps. In other words, the apportionment can be such that the total rate is equal to the rate of the received video data but not necessarily apportioned between the two links equally.

In one or more examples, at step 304, the video can be portioned on a line-by-line basis. For instance, the first line of a video frame can be transmitted using the first link, while the next line is transmitted using the second link, and the next line after that is transmitted using the first link, and so on and so forth. In one or more examples, and as described in more detail below, the apportionment of step 304 can include transmitting a portion of a frame (referred to herein as a region of interest) uncompressed over the first link, while transmitting a region of disinterest over the second link using a form of compression that can ensure that the region of disinterest fits within the bandwidth of the link used to transmit the region. In this way, the first link can transmit a small portion of the frame without compression, with the region of interest being sized so that it can fit within the bandwidth of the link being used to transmit the region of interest. The region of disinterest can be compressed (for instanced by using existing video standards such as JPEG, H.264, etc) such that the region of disinterest can be transmitted within the bandwidth of the link used to transmit the region of disinterest.

Once the video has been portioned between the first and second links at step 304, the process 300 can move to step 306, wherein the first portion of the data is apportioned for the first link, is transmitted using the first link. In one or more examples, the first portion of the data that is transmitted on the first link uses a first specification. For instance, using the example above, if the total frame rate of the video received is 60 fps, then in one or more examples, the first specification can include transmitting the portioned data at 30 fps so as to ensure that the data can be transmitted within the available bandwidth of the link. In the example of transmitting alternating lines of a frame over the link, the first specification can include transmitting the even or odds lines in a frame. In the example of transmitting a region of interest over a first link, the first specification can include transmitting the data uncompressed at 4K resolution. In one or more examples, the apportionment at step 304, and the first specification used at step 306 can work together to ensure that the bandwidth of the data being sent over the first link is within the available bandwidth of the link.

In one or more examples, either after or in parallel, the process 300 can transmit the second portion of the data on the second link at step 308. In one or more examples, the second portion of the data that is transmitted on the second link uses a second specification. For instance, using the example above, if the total frame rate of the video received is 60 fps, then in one or more examples, the second specification can include transmitting the portioned data at 30 fps so as to ensure that the data can be transmitted within the available bandwidth of the link (i.e, the second specification can be the same as the first specification). In the example of transmitting alternating lines of a frame over the link, the second specification can include transmitting the even or odds lines in a frame (i.e., the opposite of whatever the first specification of the first link is). In the example of transmitting a region of interest over a first link, the second specification of the second link can include transmitting the region of disinterest using compression such as JPEG or H.264. In one or more examples, the apportionment at step 304, and the second specification used at step 308 can work together to ensure that the bandwidth of the data being sent over the second link is within the available bandwidth of the link.

In one or more examples, once the second portion has been transmitted at step 308, the process 300 can move to step 310 wherein a determination is made as to whether the second link is operational (i.e., whether the link is still able to transmit data). In one or more examples, if the link is determined to be still operational, the process 300 can move back to 302, wherein in further data is received and transmitted over the first and second links as discussed above with respect to steps 304-308. In one or more examples, if the second link is found to not be operational, then the process 300 can move to step 312, wherein the video received at step 302 can be transmitted on the first link only using a third specification. In one or more examples, the entirety of the video data received from the medical imaging device at step 302 can be transmitted over the first link using a third specification. In one or more examples, the third specification can include transmitting the data at a reduced frame rate. For instance, using the example of 60 fps, in the event that one of the links fails, then at step 312, the entirety of the video data can be transmitted at a reduced frame rate that is commensurate with the available bandwidth of the operational link. For instance, the third specification can include transmitting the entirety of the video data at 45 fps, thereby increasing the rate (versus 30 fps when the link was only sending half the data), but lowering the overall rate for the video data to account for the bandwidth capabilities of the first link. In one or more examples, the third specification could include using compression to send the entirety of the video data (while maintaining the same frame rate). In one or more examples, the third specification can include time multiplexing a frame of video such that during a first time period a subset of the lines in a frame are transmitted using the first link, and in a second time period the remaining lines in a frame are transmitted using the first link. In the example of a region of interest scheme described above, the third specification can include transmitting the region of interest over a first time period, and the region of disinterest over a second time period. In any example, the third specification can be chosen such that the surgeon is able to continue to visualize the internal portion of the patient albeit using a degraded signal. In this way, rather than cause a stoppage to the displayed video, instead, the surgeon is provided with continuous video even if a link of the dual link system fails.

In one or more examples, the choice of how to transmit video in the event of a link/stream failure can be dependent on the source of the video data. For instance, in an endoscopic surgery that uses a camera to view in real-time the internal portion of a patient being operated on, the resulting video data may have a significant amount of motion thus requiring a fast enough frame rate to capture the motion smoothly so that the video doesn't appear choppy or jumpy to the surgeon. Thus, degrading the video to fit in the bandwidth of the remaining channel by lowering the frame rate may not be an acceptable option. In contrast, in the case of video that doesn't involve significant amounts of motion, such as radiology video, reducing the frame rate as a way to transmit the video within the available bandwidth may be acceptable. Thus, in one or more examples, in the event that a link failure is detected, the specification used to transmit the video on the remaining link can be chosen based on the type of video data being viewed.

FIG. 4A illustrates another exemplary method for transmitting medical video data in a bandwidth constrained environment according to examples of the disclosure. In one or more examples, steps 402, 404, 406, and 408 and 410 can be identical to the steps 302, 304, 306, 308, and 310 respectively described above with respect to FIG. 3. Thus, for a full discussion of those steps the corresponding discussion of FIG. 3 can be referenced.

In one or more examples, in the example of process 400, if the second link is determined to not be operational, then the process 400 can move to step 412 wherein the properties of the video source are determined. In one or more examples, and as described above, the source providing the video can itself be used to determine how to reduce the total bandwidth of the video signal in a manner that will minimize disruption to the surgical procedure and not interfere with the surgeon's ability to conduct the medical procedure. For instance, if the video data source is from a device that produces video that contains a significant amount of motion, then instead of reducing the frame rate, the resolution of the image can be reduced (i.e., the image can be downscaled). Thus, in one or more examples, at step 412, the video can be analyzed to determine how much motion is contained in the video. In one or more examples, determining the motion at step 412 can include comparing a first frame of the video data to subsequent frame of the video data to determine changes in the content of the frames (which can be indicative of motion).

Additionally or alternatively to the example above, at step 412, the amount of grayscale pixels in a given video feed can be used a property of the received video that can be determined. In one or more examples, the presence of a significant amount of grayscale pixels can mean that the color of the video is not as important as other features in the video, and thus the color information of the video can be compressed to reduce the overall bandwidth of the signal. In one or more examples, the presence of a significant amount of greyscale pixels can be indicative of a radiological image. Thus, in one or more examples, if the number of greyscale pixels is determined to exceed a pre-determined threshold at step 412, a determination can be made that the video source is a radiological device (which as discussed below, can ultimately drive the actions taken by the router in the event of a link failure). In addition to motion and color, other properties of the video source can be examined to determine the source of the video. For instance, the color content of the video, or certain artifacts in the images found in the video data can be associated with a particular type of video source, and thus used to determine if that video source is the source of the video received at step 402.

In one or more examples, the video source can be identified by a user of the video device. For instance, in one or more examples, when starting a surgical procedure, the user can identify the source of the video to the router (either directly to the router) or through a graphical user interface that upon receipt of the information can transmit the information to the router. Thus, at step 412, the determined property of the video source can be based on the user's input.

Once the one or more properties of the video feed are determined at step 412, the process 400 can move to step 414 wherein the video transmitted on the remaining link (i.e., the remaining operational link) can be transmitted using a specification that is based on the determined source or property of the video. For instance, in one or more examples, if the video is determined to contain a significant amount of motion (for instance if the video is from an endoscopic camera), then in one or more examples, the bandwidth of the video can be decreased for transmission on the remaining link by downscaling the video (i.e, reducing the resolution of the video) rather than reducing the frame rate of the video. In the case of transmission of a video signal from an endoscopic camera, generally the video signal will contain a significant amount of motion therefore it would not be advisable to reduce the frame rate which could result in readily observable tearing of the video image. Also, it would not be advisable to reduce the color and/or brightness content as these characteristics are typically of high importance for surgeries in which an endoscopic camera is used. It is likely that either downscaling the original video signal and/or using some form of light compression would result in a received signal which would be visually lossless or have the minimum visually perceivable differences. Based on this, a system could be designed such that it would be configured to automatically switch to use of either downscaling or Lite (i.e., light) compression when an endoscopic camera was used which generated a signal with higher bandwidth than the data link was constrained to.

In the example of where an amount of grayscale in the image is the property determined at step 412, then at step 414, if the amount of grayscale is above a pre-determined threshold (indicating for instance that the video feed is from a radiological imaging source) then the video data can be transmitted at a reduced frame rate (compared to the frame rate that the video data was captured at) since in a radiological setting, motion in the video is small compared to an endoscopic camera.

In the case of transmission of a video signal from some type of radiology equipment in which the amount of anticipated movement is minimal (or none like a still image X-ray), the optimal video signal characteristic to change would be the frame rate. It would not be advisable to alter either the resolution, color, and/or brightness as these characteristics are typically critical when assessing video signals generated by radiology equipment. Based on this, a system could be designed such that it would be configured to automatically switch to use frame rate reduction when a radiology equipment was used which generated a signal with higher bandwidth than the data link was constrained to.

In instances when the source equipment being connected is not known prior to commencement of transmission of a video signal, in one or more examples, real time video processing techniques can be used to assist with determining the appropriate bandwidth reduction method. For instance, in the case of radiology equipment, the video signal could be analyzed for the quantity of grayscale pixels as well as image movement to assist with determining the type of source equipment being used. An alternate method would be for the system to query the user whenever a new video signal is detected from an unknown source. The user would then select the source from a database list which would include the type of bandwidth reduction technique to use.

In one or more examples, reductions in bandwidth of a channel may be caused by other events other than the failure of a link/stream. For instance in one or more examples, the available bandwidth of a channel may temporarily decrease due to network congestion or connectivity issues in the transmission path. While the example described above with respect to FIG. 2 addresses the situation in which a link/stream outright fails, more commonly rather than failing, the channel (which may include a single link or multiple links) may suffer from temporary decreases in available bandwidth, which could result in the channel not having adequate bandwidth for the needs of the data source transmitting the data. Additionally or alternatively, rather than the channel experiencing a decrease in bandwidth, the needs of a data source may increase (for instance because the device adopts a higher resolution standard) such that the bandwidth of the channel may not be adequate for the needs of the data source. Additionally or alternatively, the needs of the data source can change due to the system requiring the medical imaging data to be routed to a different consumer device that is connected to the router with a lower or reduced aggregate bandwidth link. Additionally or alternatively, the needs of the data source can change due to a new consumer device being added to the network using a link with a lower or reduced aggregate bandwidth. Thus, in the event that there is a mismatch between the bandwidth needs of the data source and the available bandwidth of the channel used to transmit the data, in one or more examples, in order to ensure that the impact to a surgeon or other medical practitioner is minimized, the system described above with respect to FIG. 2 can employ further methods to address the mismatch.

Figure 4B:
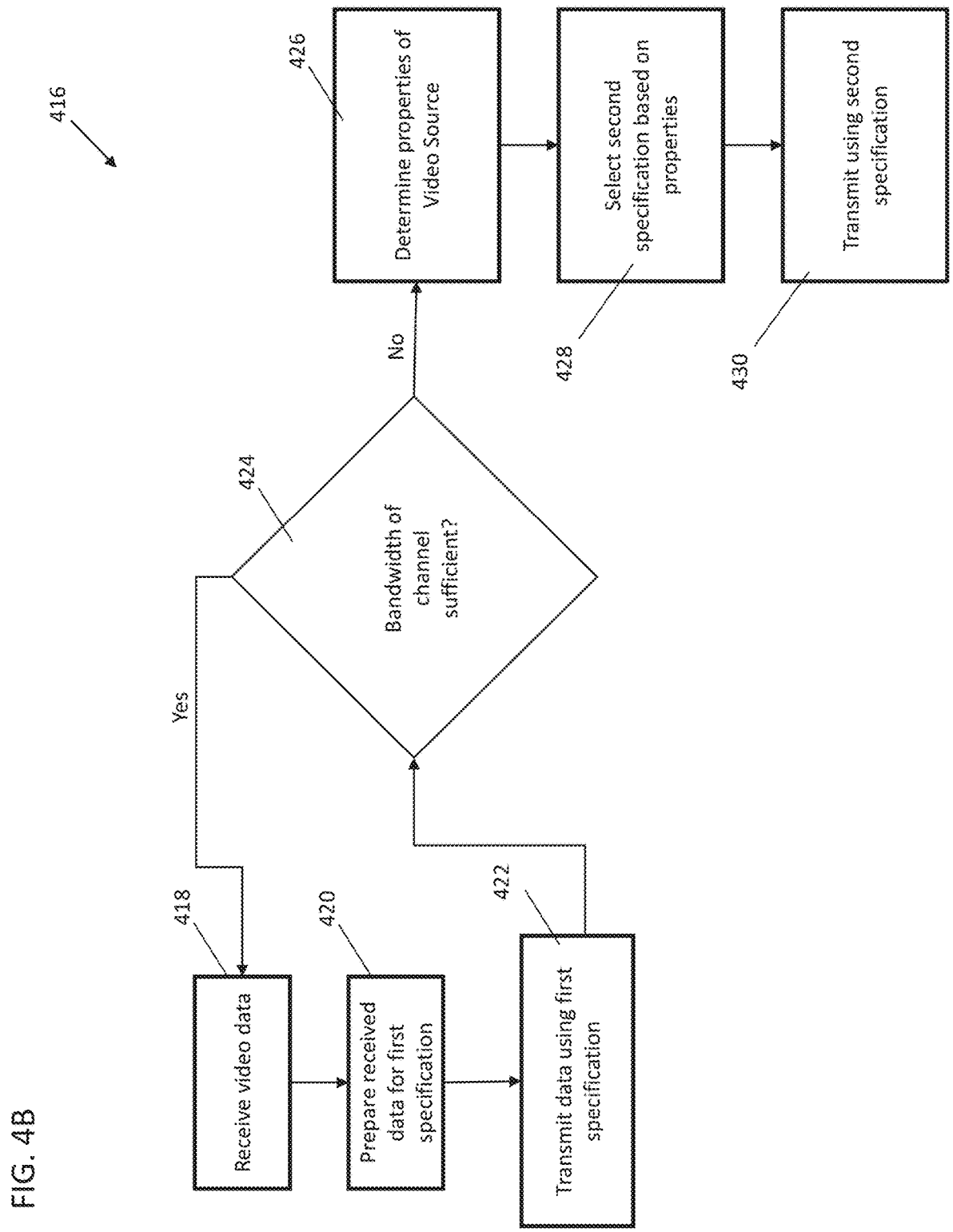
FIG. 4B illustrates another exemplary process for transmitting medical video data in a bandwidth constrained environment according to examples of the disclosure.

FIG. 4B illustrates another exemplary method for transmitting medical video data in a bandwidth constrained environment according to examples of the disclosure. The example process 416 can utilize the properties of the video to determine a method for reducing the overall bandwidth of the data to meet the available bandwidth of the channel. Thus, in contrast to the example of FIG. 4A, rather than addressing a situation in which there is link failure within a transmission channel, the example of FIG. 4B address the situation in which the aggregate or overall bandwidth of the channel decreases for any reason beyond simply a failure of a link. In one or more examples, the process 416 of FIG. 4 can begin at step 418 wherein the video data is received at an IP encoder from a medical imaging device such as a camera attached to an endoscope.

In one or more examples, once the video data is received at step 418, the process 416 can move to step 420 wherein the data is prepared for transmission by the router using a first specification. In one or more examples, the first specification can include compressing the data to decrease the overall bandwidth of the data to be transmitted, or can include any transmission specification suited to the needs of the medical practitioner (such as simple packetization) and the available bandwidth of the channel being used to transmit the data over the channel and can include transmitting the data at a particular frame rate or resolution based on the available bandwidth of the channel. Once the data has prepared at step 420, the process 416 can move to step 422 wherein the data is transmitted across the transmission channel using the first specification.

In one or more examples, before, during, or after the data has been transmitted across the transmission channel suing the first specification at step 422, the process 416 can move to step 424 wherein a determination is made as to whether the bandwidth of the channel is sufficient for the data being transmitted. In one or more examples, determining whether the bandwidth of the channel is sufficient can include determining the bandwidth needs of the data being transmitted, determining the available bandwidth of the channel being used to transmit the data, and comparing the two to determine if the available bandwidth is equal to or greater than the needed bandwidth of the data source. In one or more examples, if it is determined that the bandwidth of the channel is suited to the bandwidth requirements of the data, then in one or more examples, the process 416 can continue repeating steps 418-422 to transmit data across the channel using the first specification.

In one or more examples, if the bandwidth is found to not be sufficient at step 424, then the process 416 can move to step 426 wherein the properties of the video source are determined. Step 426 can be substantially identical to step 412 of FIG. 4A and can include determining properties such as motion, amount of grayscale pixels, color content, artifacts in an image associated with a type of video source, etc., designed to aid the system in determining what method to use to reduce the bandwidth of the data such that the disruption to the medical procedure in which the data is being used is minimized. In one or more examples, once the properties of the video source have been determined at step 426, the process 416 can move to step 428 wherein a second specification (different from the first specification of step 420) can be selected based on the properties of the video source determined at step 426. The selection of the second specification can be performed in substantially the same manner as discussed above with respect to step 414 of FIG. 4A wherein the selection of the third specification for transmission across the remaining link is selected based on the properties of the received video data. In one or more examples, once the second specification has been selected at step 428, the process 416 can move to step 430 wherein the data is transmitted using the second specification across the channel.

In one or more examples, the process 416 can begin at step 424. For instance, when a communications link between a medical imaging device and an IP decoder is first established, a test can be conducted to determine if there is sufficient bandwidth to transmit the data using a first predetermined specification. In the event that there isn't, then the process can move to step 426 as described above. In this instance, rather than requiring that the data first be transmitted using a first specification, the bandwidth of the channel can be determined a priori to determine if the bandwidth is sufficient for transmission using the first specification, and if it is not, a second specification can be chosen as discussed above with respect to steps 426-430. Additionally or alternatively, the bandwidth of the channel can be assessed at step 424, and a specification can be chosen at step 428 based on the determined properties of the video source at step 426 as well as the determined bandwidth found at step 424. In one or more examples, and using the examples of FIGS. 4A and 4B, in the event that the bandwidth is restored to a previous level, then in one or more examples, the encoder can revert back to the first specification which used a higher bandwidth method of transmitting the medical imaging data across the channel.

The system described above with respect to FIG. 2 can also be utilized to provide an alternative method of transmitting the video received from a video source to a display using an alternative apportionment scheme in which the two links/streams are used in conjunction with one another to provide the surgeon with an optimal video experience. For instance, rather than simply portioning the video such that some of the data is transmitted using a first stream of a multi-stream, and the remaining data is transmitted using the second stream, instead the system can be utilized to apply asymmetrical compression to parts of a video such that a first link is used to send uncompressed video data for a "region of interest" of the video (i.e., a portion of the video where the high video quality is desired). In many use cases, when transmitting video, there can be central region of the video display that can be considered a region of interest in applications that require high fidelity video. The remaining areas of the video display can be considered a region or regions of disinterest where fidelity is of a lesser concern. Thus in one or more examples, the region of interest (which represents a subset of the video data) can be transmitted over a first link of the dual link system in an uncompressed form, while the remaining video data (a region of disinterest) can be transmitted in a compressed form. In one or more examples, and as described in further detail below, the size of the region of interest can be constrained such that it can fit in the available bandwidth of a first link of the dual-link channel, while the amount of compression applied to the region of disinterest can be commensurate with the available bandwidth of the second link of the dual-link channel.

Figure 5:
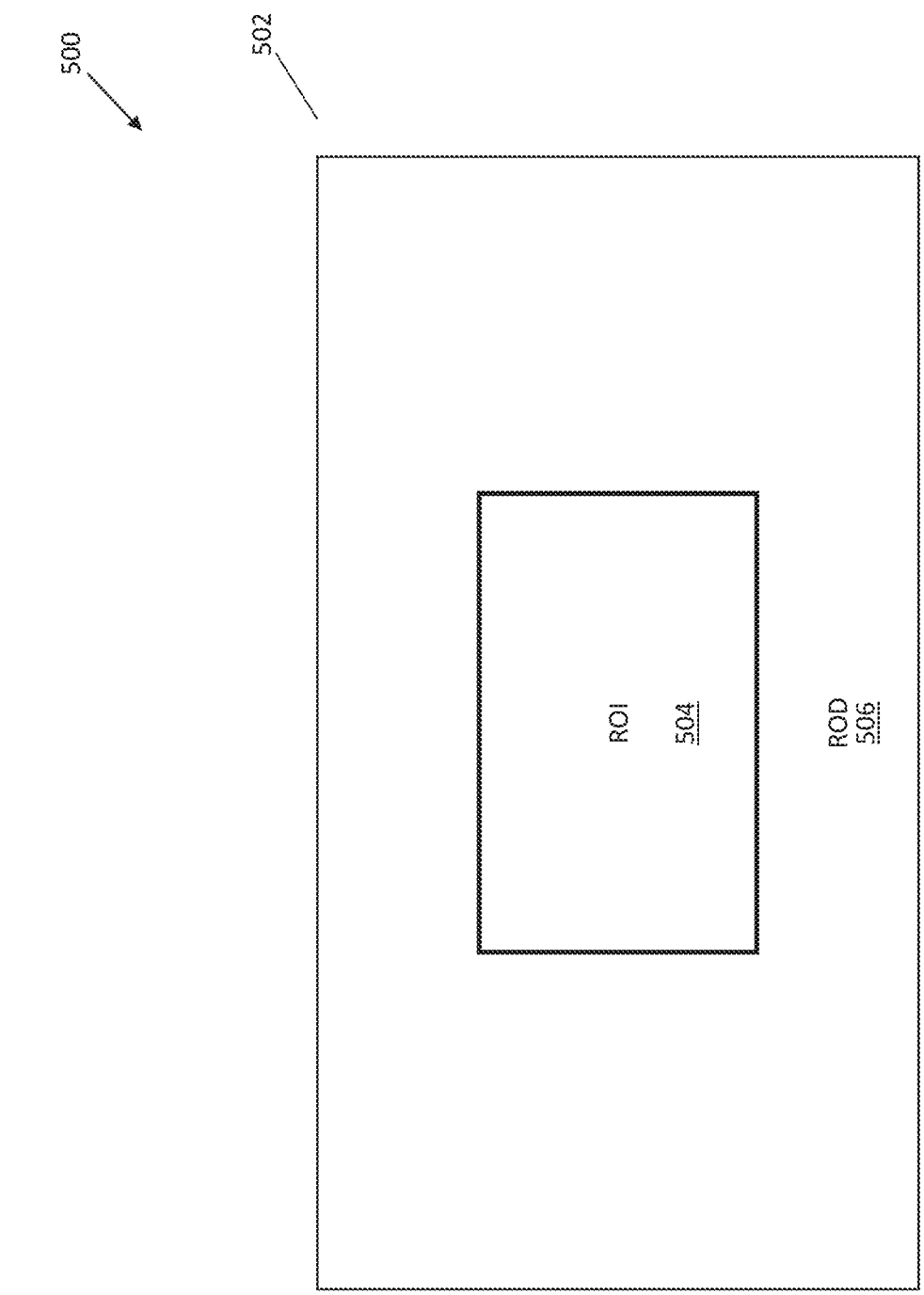
FIG. 5 illustrates an exemplary medical video data portioning scheme according to examples of the disclosure.

FIG. 5 illustrates an exemplary medical video data portioning scheme according to examples of the disclosure. The apportionment scheme 500 of FIG. 5 illustrates a frame of video data 502 in which the frame 502 is apportioned into a region of interest 504 and region of disinterest 506. In one or more examples, the region of disinterest 506 can include the entirety of frame 506, while the region of interest 504 can include a portion of the frame. In one or more examples, the region of disinterest 506 can be transmitted across a first link/stream of a logical transmission channel (described above with respect to FIG. 2) using compression (such as JPEG or H.264) commensurate with the available bandwidth of the logical link, while the region of interest 504 can be transmitted using the second link of the channel uncompressed. In one or more examples, once the region of interest 504 and the region of disinterest 506 are received at the endpoint of the channel, the region of interest 504 can be combined with region of disinterest 506 such that the region of interest 504 is overlaid on top of the compressed region of disinterest 506 and displayed. The above scheme can allow for data compression such that the data fits within the bandwidth of the channel.

In one or more examples, the size of the region of interest 504 can be based on the available bandwidth of the link used to transmit the region of the interest. Thus, in one or more examples, the size of the region of interest 504 can be proportional to the available bandwidth of the link used to transmit the region interest. In one or more examples, the amount of compression used to compress the region of disinterest 506 can be based on the available bandwidth of the link used to transmit the region of disinterest such that heavier compression is applied as the available bandwidth of the link decreases or lighter compression is applies as the available bandwidth of the link increases.

In one or more examples, the location of the region of interest can be determined using one or more machine classifiers that are trained using a machine learning classifier that is trained using a supervised training process. For instance, in one or more examples, the region of interest can be defined based on the content of the video data. In one or more examples, a machine learning classifier can be used to identify the location of one or more tools used by the surgeon in the internal portion of the patient, thus indicating where the region of interest 504 should be located. The classifier can be trained using one or more annotated training images in which the tools in a given frame of video are identified (using annotations) such that the classifier can later automatically recognize the tools present in a given frame of video so as to identify a region of interest in the frame of video.

Figure 6:
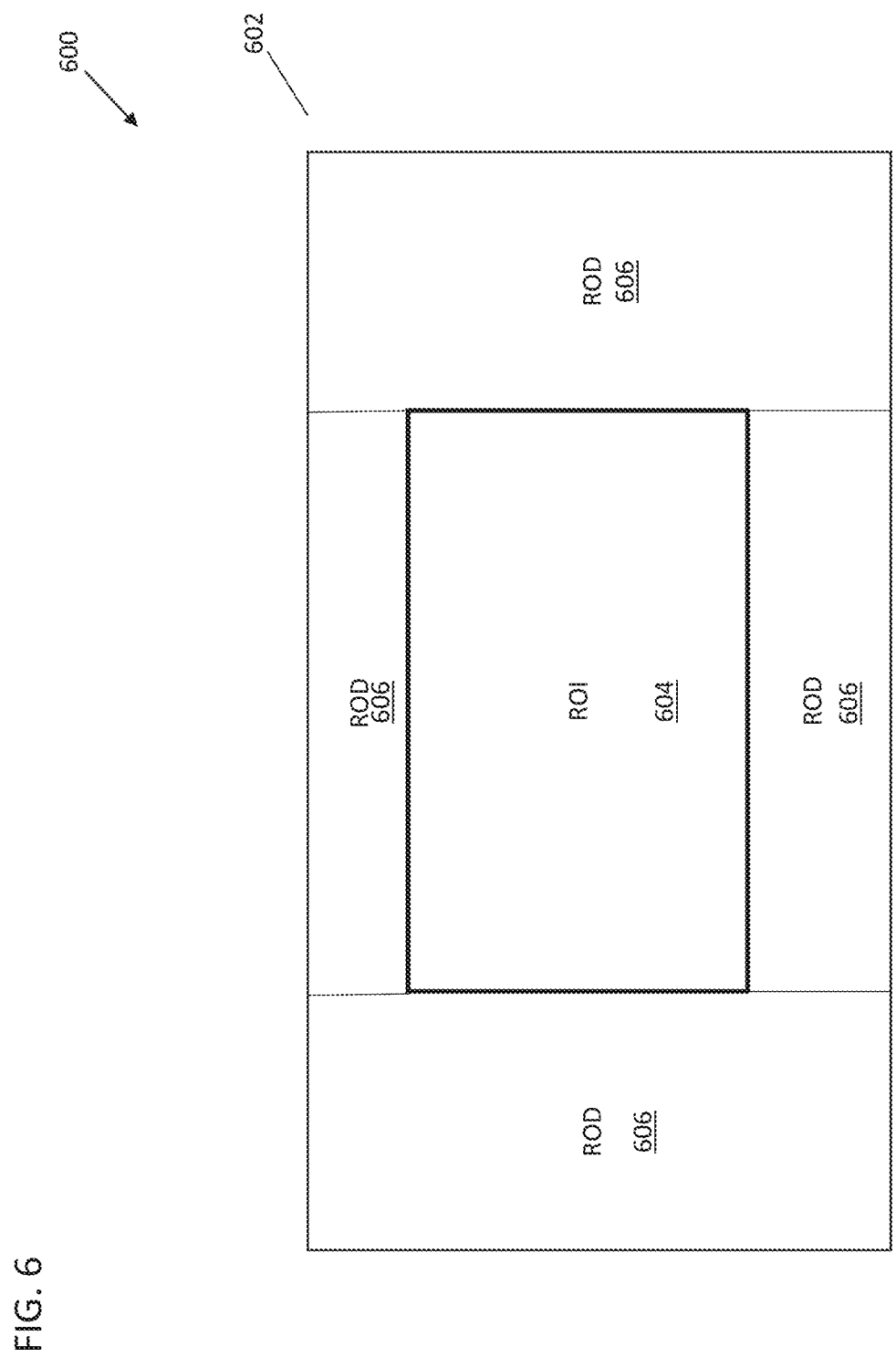
FIG. 6 illustrates another exemplary medical video data portioning scheme according to examples of the disclosure.

In one or more examples, the region of interest and the region of disinterest can be mutually exclusive. In contrast to the example of FIG. 5 where the region of interest 504 is laid on top of the region of disinterest 506, in one or more examples, the region of interest and the region of disinterest can be apportioned to separate and mutually exclusive portions of a frame of video data. FIG. 6 illustrates another exemplary medical video data portioning scheme according to examples of the disclosure. In the example scheme 600 of FIG. 6, the region of interest 604 can determined and transmitted similarly to the region of interest 504 of FIG. 5. However, in the example of FIG. 6, the region of disinterest 506 can be selected from the portion or portions of the frame 602 that are not occupied by the region of interest 604. In one or more examples, the region or regions of disinterest can be transmitted using a compression scheme as described above with respect to FIG. 5. In one or more examples, the IP router can apportion the region of disinterest into one or more regions as shown in the figure, and provide a separate stream for each region over a link of the dual-link channel. In one or more examples, the endpoint that receives the data from each link can synchronize the streams, apply any decompression if required, and reassemble the video frames for display.

Figure 7A:
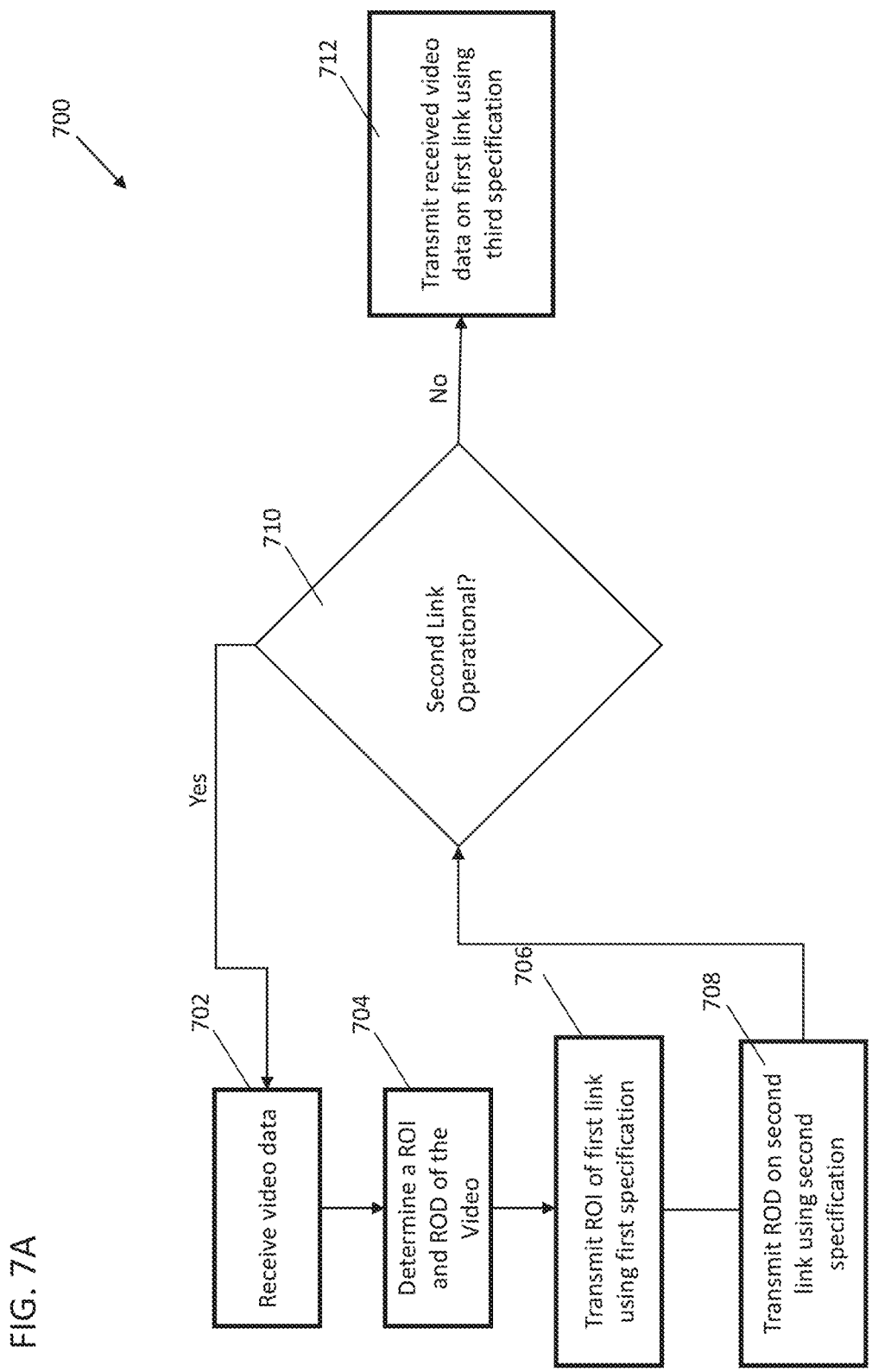
FIG. 7A illustrates another exemplary process for transmitting medical video data in a bandwidth constrained environment according to examples of the disclosure.

In one or more examples, a communications scheme in which video data is apportioned into a region of interest and a region of disinterest and transmitted on separate streams across a channel can be configured to maintain continuity of video similar to the examples described above with respect to FIGS. 3-4. FIG. 7A illustrates another exemplary process for transmitting medical video data in a bandwidth constrained environment according to examples of the disclosure. In one or more examples, the process 700 of FIG. 7 can begin at step 702 wherein one or more frames of medical video data is received from a medical imaging device. In one or more examples, once the one or more frames of data have been received at step 702, the process 700 can move to step 704 wherein a region of interest (ROI) of a frame of the medical video data can be identified. In one or more examples, the ROI can be determined using one or more of the methods described above including having the user identify the ROI, or having the ROI selected based on one or more machine learning classifiers. In one or more examples, and as described above, the size of the ROI can be based on a determined available bandwidth of the links associated with a dual-link communications scheme for instance, like the dual-link system describe above with respect to FIG. 2.

In one or more examples, at step 704, the process 700 can also determine a region of disinterest (ROD) associated with the frame of data for which a ROI was determined as described above. In one or more examples, the ROD can represent the entire frame of the video as described above with respect to FIG. 6. Additionally or alternatively, the ROD can represent the portion or portions of a frame of video that are not occupied by the identified ROI. In one or more examples, at step 704 once the ROI and ROD are identified for a given frame of video data, the router can create separate packages of data, one for the ROI and one for the ROD in preparation for transmittal over the two links of the dual-link system.

In one or more examples, after the ROI and ROD of the video data is determined and apportioned at step 704, the process 700 can move to step 706, wherein the ROI is transmitted using the first link of the dual link system using a first specification. As described above, in one or more examples, the ROI can be transmitted uncompressed at 4K resolution. In parallel, or after the ROI has been transmitted at step 706, the ROD can be transmitted at step 708 on the second link of the dual link system using a second specification. As discussed above, the second specification for the ROD can include compression so as to reduce the overall number of bits of the ROD for a given frame.

In one or more examples, once the ROD has been transmitted at step 708, the process 700 can move to step 710 wherein a determination is made as to whether the second link is operational (i.e., whether the link/stream is still available to transmit data). In one or more examples, if the link is determined to be still operational, the process 700 can move back to 702, wherein in further data is received and transmitted over the first and second links as discussed above with respect to steps 704-708. In one or more examples, if the second link is found to not be operational, then the process 700 can move to step 712, wherein the video received at step 702 can be transmitted on the first link only using a third specification. In one or more examples, the entirety of the video data received from the medical imaging device at step 702 can be transmitted over the first link using a third specification. In one or more examples, the third specification can include transmitting the data a reduced frame rate In one or more examples, the third specification could include using compression to send the entirety of the video data (while maintaining the same frame rate). In one or more examples, the third specification can include time multiplexing a frame of video such that during a first time period a subset of the lines in a frame are transmitted using the first link, and in a second time period the remaining lines in a frame are transmitted using the first link. In the example of a region of interest scheme described above, the third specification can include transmitting the region of interest over a first time period, and the region of disinterest over a second time period. In any example, the third specification can be chosen such that the surgeon is able to continue to visualize the internal portion of the patient albeit using a degraded signal. In this way, rather than cause a stoppage to the displayed video, instead, the surgeon is provided with continuous video even if a link of the dual link system fails. In one or more examples, the selection of the third specification can be based on properties of the video data in the manner described above with respect to FIG. 4.

The example of FIG. 7A provides an exemplary process in which the ROI and ROD of image or video frame are transmitted on two or more separate streams, and there is a failure in one of the streams, however the concept of tailoring the ROI and ROD based on the status of the transmission channel can be applied to other contexts in which the bandwidth needed to transmit a given ROI and ROD over a channel may not be commensurate with the available bandwidth of the channel. As described above, in one or more examples, reductions in bandwidth of a channel may be caused by other events other than the failure of a link/stream. For instance in one or more example, the available bandwidth of a channel may temporarily decrease due to network congestion or connectivity issues in the transmission path. While the example described above with respect to FIG. 2 addresses the situation in which a link/stream outright fails, more commonly rather than failing, the channel (which may include a single link or multiple links) may suffer from temporary decreases in available bandwidth, which could result in the channel not having adequate bandwidth for the needs of the data source transmitting the data. Additionally or alternatively, rather than the channel experiencing a decrease in bandwidth, the needs of a data source may increase (for instance because the device adopts a higher resolution standard) such that the bandwidth of the channel may not be adequate for the needs of the data source. Additionally or alternatively, the needs of the data source can change due to the system requiring the medical imaging data to be routed to a different consumer device that is connected to the router with a lower or reduced aggregate bandwidth link. Additionally or alternatively, the needs of the data source can change due to a new consumer device being added to the network using a link with a lower or reduced aggregate bandwidth. Thus, in the event that there is a mismatch between the bandwidth needs of the data source and the available bandwidth of the channel used to transmit the data, in one or more examples, in order to ensure that the impact to a surgeon or other medical practitioner is minimized, the ROI and ROD scheme described above with respect to FIG. 7A can also be applied to systems in which the ROI and ROD may not be sent on separate streams/links.

Figure 7B:
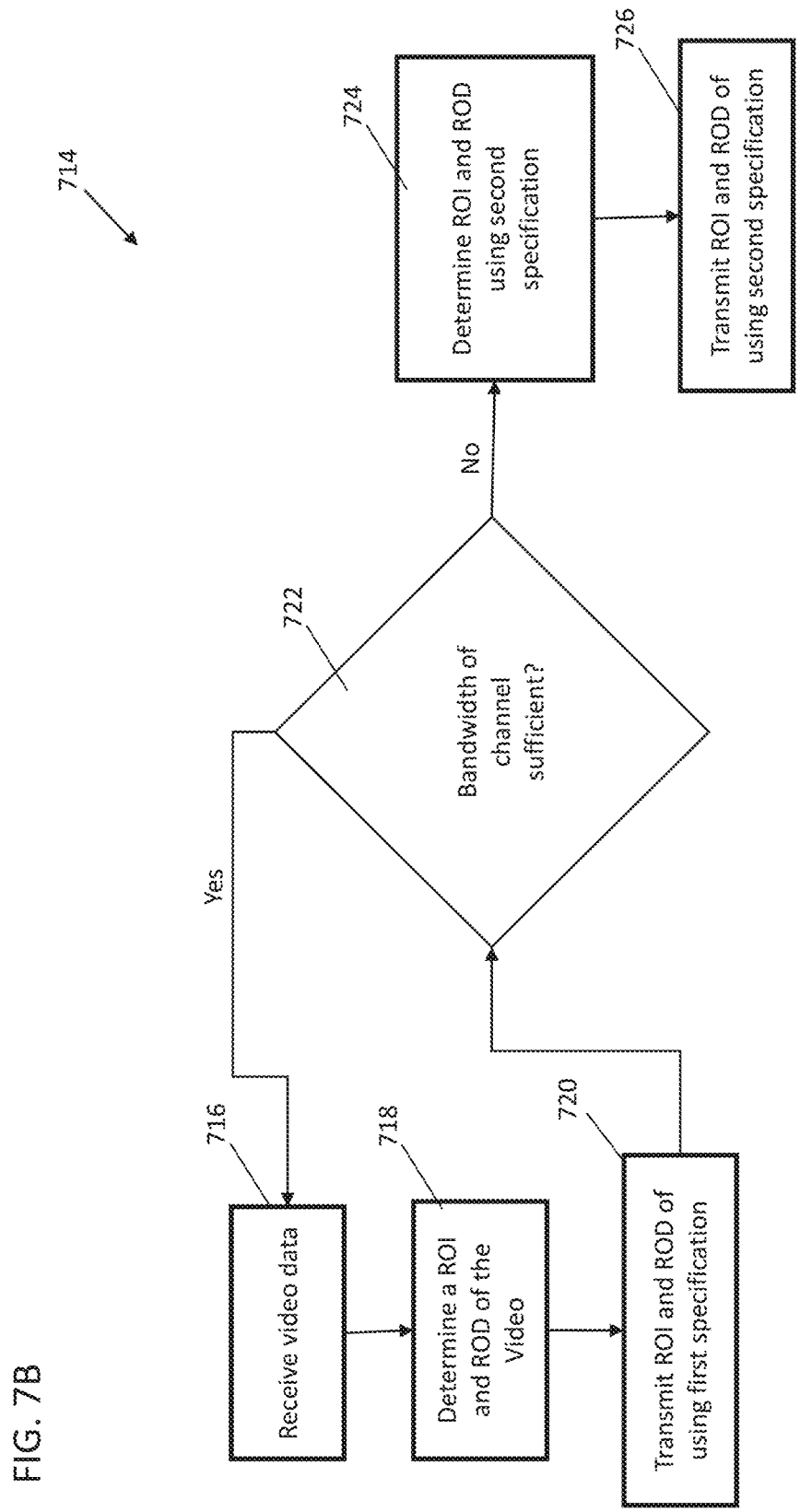
FIG. 7B illustrates another exemplary process for transmitting medical video data in a bandwidth constrained environment according to examples of the disclosure.

FIG. 7B illustrates another exemplary process for transmitting medical video data in a bandwidth constrained environment according to examples of the disclosure. In one or more examples, the process 714 of FIG. 7B can begin at step 716 wherein medical imaging data is received. In one or more examples, step 716 can be substantially identical to step 702 of FIG. 7A, and thus the explanation of step 702 can be referenced above. In one or more examples, once a video frame or image is received at step 716, the process 714 can move to step 718 wherein an ROI and ROD of the video is determined using a first specification. In one or more examples, the ROI can be determined using one or more of the methods described above including having the user identify the ROI, or having the ROI selected based on one or more machine learning classifiers. In one or more examples, and as described above, the size of the ROI can be based on a determined available bandwidth of the channel that will be used to transmit the video data for display. Thus, in one or more examples, the size and an amount of compression of the ROI can be determined based on any combination of a user's preferences, one or more machine learning classifiers trained to identify an ROI from an image, as well as the bandwidth of the channel used to transmit the medical imaging data for display.

In one or more examples, and also at step 718, the process 714 can also determine a region of disinterest (ROD) associated with the frame of data for which a ROI was determined as described above. In one or more examples, the ROD can represent the entire frame of the video as described above with respect to FIG. 6. Additionally or alternatively, the ROD can represent the portion or portions of a frame of video that are not occupied by the identified ROI. In one or more examples, the size of the ROD can be selected based on the user's preferences, the bandwidth of the channel being used to transmit the ROD, as well as one or more machine learning classifiers.

In one or more examples, once the choices of size and compression for both the ROI and ROD determined at step 718 can form a first specification for the transmission of the medical imaging data across the transmission channel. Thus, once the first specification has been determined at step 718, in one or more examples, the process 714 can move to step 720 wherein the ROI and ROD of the image/frame can be transmitted using the first specification. In one or more examples, transmission of the ROI and ROD using the first specification at step 720 can include transmitting the data using a logical link that includes any number of physical links (wired or wireless) and/or any number of separate streams of data sent across the physical links. Thus, in one or more examples, regardless of how the data is transmitted to the endpoints for display, the ROI and ROD can both be sent across the channel according to the first specification determined at step 718.

In one or more examples, before, during, or after the data has been transmitted across the transmission channel suing the first specification at step 720, the process 714 can move to step 722 wherein a determination is made as to whether the bandwidth of the channel is sufficient for the data being transmitted. In one or more examples, determining whether the bandwidth of the channel is sufficient can include determining the bandwidth needs of the data being transmitted, determining the available bandwidth of the channel being used to transmit the data, and comparing the two to determine if the available bandwidth is equal to or greater than the needed bandwidth of the data source. In one or more examples, if it is determined that the bandwidth of the channel is suited to the bandwidth requirements of the data, then in one or more examples, the process 714 can continue repeating steps 716-720 to transmit data across the channel using the first specification.

If however, the bandwidth of the channel is found to be insufficient at step 722, then the process 714 can move to step 724 wherein the ROI and ROD are adjusted according to the determined bandwidth of the channel. For instance, in one or more examples, the size of the ROI can be decreased (thereby decreasing the amount of lightly or uncompressed data to be transmitted). Additionally or alternatively, the amount of compression applied to the ROI can be increased in response to a determination that the bandwidth of the channel is insufficient at step 722. Similarly, the ROD can be modified based on a determination of insufficient bandwidth at step 722. For instance, in one or more examples, if the size of the ROI is decreased at step 724, then the size of the ROD can be commensurately increased to account for the decrease. Additionally or alternatively, the amount of compression applied to the ROD can be increased to decrease the overall amount of data to be sent across the channel per image or video frame. The adjustments made to the ROI and ROD determined at step 724 can form a second specification, and once determined the ROI and ROD can be transmitted across the channel using the second specification at step 726.

In one or more examples, the process 714 can begin at step 722. For instance, when a communications link between a medical imaging device and an IP decoder is first established, a test can be conducted to determine if there is sufficient bandwidth to transmit the data using a first predetermined specification. In the event that there isn't, then the process can move to step 724 as described above. In this instance, rather than requiring that the data first be transmitted using a first specification, the bandwidth of the channel can be determined a priori to determine if the bandwidth is sufficient for transmission using the first specification, and if it is not, a second specification can be chosen as discussed above with respect to steps 724-726. Additionally or alternatively, the bandwidth of the channel can be assessed at step 722, and a specification can be chosen at step 724 based on the determined properties of the video source as well as the determined bandwidth found at step 722. In one or more examples, and using the examples of FIGS. 7A and 7B, in the event that the bandwidth is restored to a previous level, then in one or more examples, the encoder can revert back to the first specification which used a higher bandwidth method of transmitting the medical imaging data across the channel.

The systems and methods described above, can be configured to respond to changes in channel bandwidth in a manner that minimizes any interruptions or interferences with a surgeon's video experience during a medical procedure.

Figure 8:
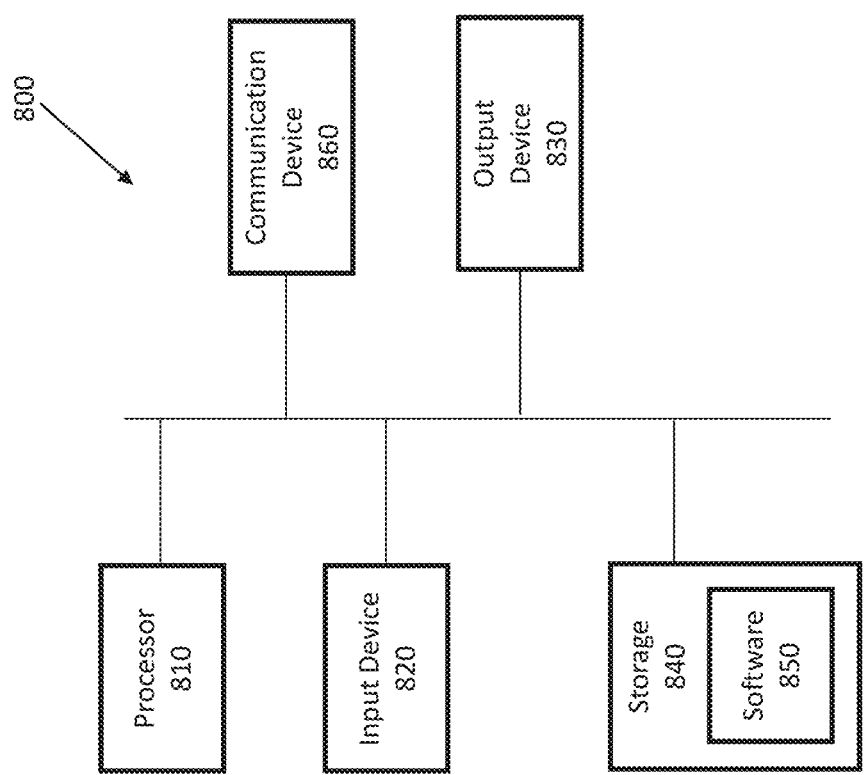
FIG. 8 illustrates an exemplary computing system according to examples of the disclosure.

FIG. 8 illustrates an example of a computing system 800, in accordance with some embodiments, that can be used for one or more of components of system 100 of FIG. 1, such as one or more of camera head 108, and camera control unit 112. System 800 can be a computer connected to a network, such as one or more networks of hospital, including a local area network within a room of a medical facility and a network linking different portions of the medical facility. System 800 can be a client or a server. As shown in FIG. 8, system 800 can be any suitable type of processor-based system, such as a personal computer, workstation, server, handheld computing device (portable electronic device) such as a phone or tablet, or dedicated device. The system 800 can include, for example, one or more of input device 820, output device 830, one or more processors 810, storage 840, and communication device 860. Input device 820 and output device 830 can generally correspond to those described above and can either be connectable or integrated with the computer.

Input device 820 can be any suitable device that provides input, such as a touch screen, keyboard or keypad, mouse, gesture recognition component of a virtual/augmented reality system, or voice-recognition device. Output device 830 can be or include any suitable device that provides output, such as a display, touch screen, haptics device, virtual/augmented reality display, or speaker.

Storage 840 can be any suitable device that provides storage, such as an electrical, magnetic, or optical memory including a RAM, cache, hard drive, removable storage disk, or other non-transitory computer readable medium. Communication device 860 can include any suitable device capable of transmitting and receiving signals over a network, such as a network interface chip or device. The components of the computing system 800 can be connected in any suitable manner, such as via a physical bus or wirelessly.

Processor(s) 810 can be any suitable processor or combination of processors, including any of, or any combination of, a central processing unit (CPU), field programmable gate array (FPGA), and application-specific integrated circuit (ASIC). Software 850, which can be stored in storage 840 and executed by one or more processors 810, can include, for example, the programming that embodies the functionality or portions of the functionality of the present disclosure (e.g., as embodied in the devices as described above)

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for transmitting medical video data on a communications channel of a medical data routing system, the method comprising:
    receiving video data from a medical video source;
    transmitting the received video to a display according to a first pre-defined specification;
    determining if a bandwidth of the communications channel is sufficient to transmit the received video data;
    if it is determined that the bandwidth of the communications channel is not sufficient to transmit the received video data, analyzing contents of one or more frames of the video data received from the medical video source to determine at least one characteristic of the contents of the video data;
    selecting a second pre-defined specification based on the determined at least one characteristic of the contents of the video data received from the medical video source; and
    transmitting the received video data using the second pre-defined specification.

2. The method of claim 1, wherein the video data received from the medical video source comprises endoscopic camera video data.

3. The method of claim 2, wherein if the determined at least one characteristic of the contents of the video data is a characteristic of endoscopic camera video data, then the second pre-defined specification comprises downscaling the received video data from the medical video source.

4. The method of claim 2, wherein if the determined at least one characteristic of the contents of the video data is a characteristic of endoscopic camera video data, then the second specification comprises applying a light compression process to the received video data.

5. The method of claim 1, wherein the at least one characteristic of the contents of the video data is a characteristic of radiology video data.

6. The method of claim 5, wherein if the determined at least one characteristic of the contents of the video data is a characteristic of radiology video data, then the second pre-defined specification comprises transmitting the video data at a frame rate that is lower than the frame rate of the received video data from the medical video source.

7. The method of claim 1, wherein determining at least one characteristic of the contents of the video data comprises receiving identification data pertaining to the medical video source configured to identify the characteristic of the contents of the video data received from the medical video source.

8. The method of claim 1, wherein determining at least one characteristic of the contents of the video data comprises determining a quantity of grayscale pixels in the received video data.

9. The method of claim 8, wherein if the determined quantity of grayscale pixels in the received video data exceeds a pre-defined threshold, then the determined at least one characteristic of the contents of the video data is a characteristic of radiology video data.

10. The method of claim 1, wherein determining at least one characteristic of the contents of the video data comprises determining an amount of movement in the video data.

11. A method for transmitting medical video data on a communications channel of a medical data routing system, the method comprising:

receiving video data from a medical video source;

determining if a bandwidth of the communications channel is sufficient to transmit the received video data;

if it is determined that the bandwidth of the communications channel is not sufficient to transmit the received video data, analyzing contents of one or more frames of the video data received from the medical video source to determine at least one characteristic of the contents of the video data;

selecting a pre-defined specification based on the determined at least one characteristic of the contents of the video data received from the medical video source; and transmitting the received video data using the pre-defined specification.

12. The method of claim 11, wherein the at least one characteristic of the contents of the video data received from the medical video source is a characteristic of endoscopic camera video data.

13. The method of claim 12, wherein if the determined at least one characteristic of the contents of the video data is a characteristic of endoscopic camera video data, then the pre-defined specification comprises downscaling the received video data from the medical video source.

14. The method of claim 12, wherein if the determined at least one characteristic of the contents of the video data is endoscopic camera video data, then the pre-determined specification comprises applying a light compression process to the received video data.

15. The method of claim 11, wherein the at least one characteristic of the contents of the video data is a characteristic of radiology video data.

16. The method of claim 15, wherein if the determined at least one characteristic of the contents of the video data is a characteristic of radiology video data, then the pre-defined specification comprises transmitting the video data at a frame rate that is lower than the frame rate of the received video data from the medical video source.

17. The method of claim 11, wherein determining at least one characteristic of the contents of the video data comprises receiving identification data pertaining to the medical video source configured to identify the characteristic of the contents of the video data received from the medical video source.

18. The method of claim 11, wherein determining at least one characteristic of the contents of the video data comprises determining a quantity of grayscale pixels in the received video data.

19. The method of claim 11, wherein determining at least one characteristic of the contents of comprises determining an amount of movement in the video data.

* * * * *